United States Patent
Fujita et al.

(10) Patent No.: US 12,162,057 B2
(45) Date of Patent: Dec. 10, 2024

(54) METHOD FOR MANUFACTURING HOT-PRESS-FORMED ARTICLE, AND HOT-PRESS-FORMED ARTICLE

(71) Applicant: NIPPON STEEL CORPORATION, Tokyo (JP)

(72) Inventors: Soshi Fujita, Tokyo (JP); Yuki Suzuki, Tokyo (JP); Masahiro Fuda, Tokyo (JP); Hideaki Irikawa, Tokyo (JP); Masahiro Kubo, Tokyo (JP); Naruhiko Nomura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 98 days.

(21) Appl. No.: 17/918,265

(22) PCT Filed: Apr. 20, 2021

(86) PCT No.: PCT/JP2021/015950
§ 371 (c)(1),
(2) Date: Oct. 11, 2022

(87) PCT Pub. No.: WO2021/215418
PCT Pub. Date: Oct. 28, 2021

(65) Prior Publication Data
US 2023/0166314 A1    Jun. 1, 2023

(30) Foreign Application Priority Data
Apr. 20, 2020    (JP) .................................. 2020-074701

(51) Int. Cl.
*B21D 22/20*    (2006.01)
*B21D 53/88*    (2006.01)
(Continued)

(52) U.S. Cl.
CPC ............ *B21D 22/208* (2013.01); *B21D 53/88* (2013.01); *C21D 9/46* (2013.01); *C23C 2/28* (2013.01);
(Continued)

(58) Field of Classification Search
None
See application file for complete search history.

(56) References Cited

U.S. PATENT DOCUMENTS
6,296,805 B1    10/2001    Laurent et al.
2011/0030441 A1    2/2011    Maki et al.
(Continued)

FOREIGN PATENT DOCUMENTS
EP    3170658 A1 *    5/2017    ............... B05D 7/14
JP    3931251 B2    6/2007
(Continued)

*Primary Examiner* — Seth Dumbris
(74) *Attorney, Agent, or Firm* — Birch, Stewart, Kolasch & Birch, LLP

(57) ABSTRACT

This manufacturing method of a hot press-formed article includes a heating step of heating an Al-plated steel sheet and a forming step of obtaining a hot press-formed article using a die after the heating step, the Al-plated steel sheet has a base steel sheet, an Al plating layer, and a coating layer, the coating layer is a metal layer containing at least one metal of Mg, Ca, V, Ti, and Zn, a metal oxide layer containing an oxide of one or more of Mg, Ca, V, Ti, and Zn, or a mixed layer including the metal layer and the metal oxide layer, the die has a hard layer on a surface, $HV_{Die}$ that is a surface hardness of the die at a position of the hard layer is HV1500 or more and HV3800 or less, and a temperature Tm of the Al-plated steel sheet at a start of forming and an average movement velocity V of the die in the forming step satisfy $800-(HV_{Die}/40) \leq Tm \leq 850-(V/4)-(HV_{Die}/100)$.

12 Claims, 2 Drawing Sheets

(51) Int. Cl.
  *C21D 9/46* (2006.01)
  *C23C 2/28* (2006.01)
  *C23C 2/12* (2006.01)
  *C23C 2/16* (2006.01)

(52) U.S. Cl.
  CPC .................. *C23C 2/29* (2022.08); *C23C 2/12* (2013.01); *C23C 2/16* (2013.01); *Y10T 428/12757* (2015.01)

(56) References Cited

U.S. PATENT DOCUMENTS

| | | | |
|---|---|---|---|
| 2014/0020795 A1* | 1/2014 | Schwinghammer ... | C21D 8/005 |
| | | | 148/533 |
| 2015/0352623 A1 | 12/2015 | Yamamoto | |
| 2017/0043386 A1* | 2/2017 | Nakagaito ............. | B21D 37/16 |
| 2018/0141102 A1 | 5/2018 | Honda | |
| 2020/0024748 A1 | 1/2020 | Kubo et al. | |
| 2021/0114074 A1 | 4/2021 | Kubo et al. | |
| 2021/0220895 A1 | 7/2021 | Kubo et al. | |

FOREIGN PATENT DOCUMENTS

| | | |
|---|---|---|
| JP | 6055324 B2 | 12/2016 |
| JP | 6125313 B2 | 5/2017 |
| JP | 6369659 B1 | 8/2018 |
| JP | 6477867 B2 | 3/2019 |
| TW | 201731988 A * | 9/2017 |
| WO | WO 2009/131233 A1 | 10/2009 |
| WO | WO 2019/198728 A1 | 10/2019 |
| WO | WO 2020/009170 A1 | 1/2020 |

* cited by examiner

| EXTERNAL APPEARANCE AFTER SLIDING | | GLOSSINESS (GS60°) |
|---|---|---|
| Very Good |  | 20 |
| Good |  | 28 |
| Bad |  | 52 |

30mm

METHOD FOR MANUFACTURING HOT-PRESS-FORMED ARTICLE, AND HOT-PRESS-FORMED ARTICLE

TECHNICAL FIELD OF THE INVENTION

The present invention relates to a manufacturing method of a hot press-formed article and a hot press-formed article.

Priority is claimed on Japanese Patent Application No. 2020-074701, filed Apr. 20, 2020, the content of which is incorporated herein by reference.

RELATED ART

In recent years, there has been a request for suppressing the consumption of chemical fuels in order for environmental protection and global warming prevention. Regarding such a request, for example, automobiles, which are indispensable for daily lives and activities as a movement unit, are no exception. In response to such a request, for automobiles, studies are underway about improvement in fuel efficiency by the weight reduction of vehicle bodies or the like. Since the majority of automobile structures are formed of iron, particularly, steel sheets, the weight reduction of steel sheets by thinning is significantly effective for the weight reduction of vehicle bodies. However, when the weight of a steel sheet is reduced simply by thinning the thickness of the steel sheet, there is a concern that the strength of the structure may decrease and the safety may deteriorate. Therefore, in thinning the thickness of the steel sheet, it is required to increase the mechanical strength of the steel sheet to be used so as not to decrease the strength of the structure.

Therefore, research and development are underway regarding steel sheets capable of maintaining or increasing the mechanical strength in spite of a thinner thickness compared with steel sheets used ever by increasing the mechanical strength of the steel sheet. Such a request for steel sheets is true not only in the automobile manufacturing industry but also in a variety of manufacturing industries.

In general, materials having a high mechanical strength tend to have poor shape fixability in forming such as bending, and, in the case of processing the material into a complicated shape, the processing itself becomes difficult. As one of methods for solving this problem regarding formability, a so-called "hot pressing method (also referred to as a hot pressing method, a hot stamping method, a high-temperature pressing method, a warm pressing method, or a diequenching method)" is an exemplary example. In this hot pressing method, a material, which is a subject to be formed, is once heated to a high temperature (for example, 850° C. or higher) to be austenitized, the material softened by heating is formed by pressing, and then, or at the same time as forming, the material is rapidly cooled with a die to undergo martensitic transformation, whereby it is possible to obtain a high-strength processed product after forming.

According to this hot pressing method, since the material is once heated to a high temperature to be softened and is pressed in a softened state, the material can be easily pressed. Therefore, this hot pressing makes it possible to obtain a press-formed article having both favorable shape fixability and a high mechanical strength. Particularly, in a case where the material is steel, it is possible to increase the mechanical strength of a press-formed article by the quenching effect of cooling after forming.

However, in the case of applying this hot pressing method to a steel sheet, heating of the steel sheet to, for example, a high temperature of 800° C. to 850° C. or higher oxidizes iron or the like on the surface to form scale (oxide). Therefore, a step of removing this scale (descaling step) is required after hot pressing, which degrades the productivity. In addition, for a member or the like that requires corrosion resistance, there is a need to perform an antirust treatment or metal coating on the surface of the member after processing, and thus a surface cleaning step and a surface treatment step are required, which also degrades the productivity.

An example of a method for suppressing such degradation of the productivity, a method in which a coating is provided on a steel sheet is an exemplary example. Generally, as the coating on the steel sheet, a variety of materials such as organic materials or inorganic materials are in use. Among them, zinc-based plating having a sacrificial protection action is often applied to steel sheets from the viewpoint of the anticorrosion performance and a steel sheet production technique. Incidentally, the heating temperature in hot pressing is often a temperature higher than the Ac3 transformation point of steel in order to obtain a quenching effect, and the heating temperature is, for example, about 800° C. to 1000° C. However, this heating temperature is higher than the decomposition temperatures of organic materials or the boiling points of metallic materials such as Zn-based metallic material. Therefore, in a case where a steel sheet coated with an organic material or a Zn-based metallic material is heated for hot pressing, there is a case where a plating layer on the surface of the steel sheet evaporates, which causes significant deterioration of surface properties.

In the case of avoiding such deterioration of surface properties, it is preferable to coat a steel sheet, on which hot pressing where the steel sheet is heated to a high temperature is to be performed, with, for example, an Al-based metal having a higher boiling point than organic material coatings or Zn-based metallic coatings.

The use of a steel sheet provided with an Al-based metallic coating, a so-called Al-plated steel sheet makes it possible to prevent scale from adhering to the surface of the steel sheet and makes steps such as the descaling step unnecessary, which improves the productivity. In addition, since the Al-based metallic coating also has an antirust effect, the corrosion resistance after coating also improves.

For example. Patent Document 1 describes a method in which an Al-plated steel sheet including an Al-based metallic coating provided on steel having a predetermined steel component is used for hot pressing.

However, when a conventional Al-plated steel sheet for hot press forming (a plated steel sheet having Al plating layers on both surfaces of the steel sheet) is hot press-formed, since an Al alloy plating layer on the surface of the Al plating layer or an oxide film (alumina) that is formed on the surface of the Al alloy plating layer is hard, there is a case where the surface of a die wears and consequently, in particular, the shape of the die distorts, which is a problem.

With respect to such a problem, Patent Document 2 discloses a plated steel sheet for hot pressing in which a zinc-based metal soap coating is provided on the surface of the plated steel sheet body on the Al plating layer side. Patent Document 2 discloses that the occurrence of wear of the sliding surface of a hot pressing die (die) after hot press forming is suppressed.

However, in the technique of Patent Document 2, there was a case where a material and the die are rubbed against each other during hot forming, a part of the metal soap coating is peeled off, which causes wear on the die, and, when hot pressing is continued several times, the surface unevenness of the worn die increases. In this case, there was a problem of galling occurring on the material side after press forming or a problem of the deterioration of the sliding ability.

With respect to such a problem, in recent years, studies have been underway regarding enhancement of the wear resistance of a die by performing a treatment for forming a hard layer such as a nitriding treatment or a PVD treatment on the surface of a material of the die.

For example, Patent Document 3 discloses a technique in which a hard membrane is provided on a die that is used for the hot pressing of zinc-plated steel sheets. In addition, Patent Documents 4, 5, and 6 disclose a technique in which, in the hot pressing of an aluminum or zinc-plated steel sheet or an Al-plated steel sheet having a zinc compound or metallic zinc layer as the outermost layer on an Al plating layer, a die provided with a hard PVD membrane such as a nitride is used.

Incidentally, press-formed articles that are used for automobiles and the like are also required to have a low glossiness and a beautiful external appearance. This is because, when the glossiness is high, it is considered that there are many defects on a formed article, and there is a concern that the corrosion resistance may deteriorate. However, in hot stamping, normally, a standing wall portion is rubbed against a die, the glossiness increases, and the quality of external appearance deteriorates. In the case of using a technique in which a die described in Patent Documents 3 to 6 provided with a hard membrane such as a nitriding layer or PVD on the surface of the die, since the surface of the die is hard, there is a problem in that a defect is likely to be generated on the surface of the material. Particularly, in a case where a hot pressing method such as hot stamping is used, since a material is quickly press-formed up to the bottom dead point in a high-temperature state, the surface of the material is in a state of being softened at a high temperature, a defect is more likely to be generated on the surface of the material due to the die, and the external appearance of the surface of a press-formed article is impaired.

That is, conventionally, when a formed article (hot press-formed article) is manufactured by hot pressing an Al-plated steel sheet, it was difficult to ensure an excellent surface external appearance (low glossiness) of the formed article and then suppress the wearing of the die.

PRIOR ART DOCUMENT

Patent Document

[Patent Document 1] Japanese Patent No. 3931251
[Patent Document 2] Japanese Patent No. 6369659
[Patent Document 3] Japanese Patent No. 6055324
[Patent Document 4] Japanese Patent No. 6477867
[Patent Document 5] Japanese Patent No. 6125313
[Patent Document 6] PCT International Publication No. WO 2019-198728

DISCLOSURE OF THE INVENTION

Problems to be Solved by the Invention

The present invention has been made in view of the above-described problem.

An object of the present invention is to provide a manufacturing method of a hot press-formed article in order to obtain a hot press-formed article having an excellent surface external appearance (external appearance) while suppressing the wear of a die and a hot press-formed article having an excellent surface external appearance.

Means for Solving the Problem

As a result of studies, the present inventors found that, at the time of hot pressing an Al-plated steel sheet using a die having a hard layer formed on the surface in order to enhance the wear resistance of the die (die), when the temperature of the Al-plated steel sheet at the start of the forming (when the moving die comes into contact with the Al-plated steel sheet) is indicated by Tm in the unit of ° C., and the average movement velocity (so-called forming velocity) of the die from the start of the forming to arrival of the bottom dead point (when the die reaches the bottom dead point) is indicated by V in the unit of mm/s, the Tm and the V satisfy the following formula (1), and, $$800-(HV_{Die}/40) \leq Tm \leq 850-(V/4)-(HV_{Die}/100) \quad \text{Formula (1)}$$

furthermore, a metal layer containing at least one metal of Mg, Ca, V, Ti, and Zn, a metal oxide layer containing an oxide of Mg, Ca, V, Ti, or Zn, or a mixed layer of the metal layer and the metal oxide layer is formed on the surface of the Al-plated steel sheet that is subjected to forming, whereby it is possible to suppress the gloss of a formed article at a low level and to obtain a hot press-formed article having excellent surface external appearance.

This formula (1) means that, in a case where a hard layer that enhances wear resistance is present on the surface of a die, the control of the forming start temperature and the average movement velocity of the die in accordance with the hardness of the hard layer is important in order to obtain a hot press-formed article having excellent surface external appearance.

The formula $Tm \leq 850-(V/4)-(HV_{Die}/100)$ that decides the upper limit of the forming start temperature means that 1) as the temperature increases, the hardness of the surface of an Al-plated steel sheet is gradually softened, and a defect is more likely to be generated, and thus it is important to suppress the forming start temperature at a certain temperature or lower, 2) during forming, the Al-plated steel sheet comes into contact with a die, whereby heat is removed, and the Al-plated steel sheet is cooled; however, when the forming velocity is fast, the removal of heat is suppressed, and thus, even when the forming start temperature is the same, as the forming velocity becomes faster, the surface of the Al-plated steel sheet is processed in a more softened state, and thus there is a need to lower the forming start temperature in accordance with the forming velocity, and 3) the degree of easiness in the generation of a defect is affected by the hardness of the hard layer on the surface of the die, and thus, as the hardness of the surface of the die increases, there is a need to lower the forming start temperature.

In addition, the formula $800-(HV_{Die}/40) \leq Tm$ that decides the lower limit of the forming start temperature means that, when the forming start temperature is low, the surface of the Al-plated steel sheet becomes hard, the die side is likely to be damaged, and the wear resistance of the die deteriorates. When the wear resistance of the die deteriorates, the surface of the die becomes uneven due to the defect generated in the die, and as a result, the surface of the hot press-formed article is damaged due to the local stress concentration attributed to protrusions of the die, and the surface external appearance deteriorates.

The coefficients (¼, ¹⁄₄₀, and ¹⁄₁₀₀) in the formula (1) are values for converting the influence of the Vickers hardness or the forming velocity derived from the experiences of the inventors obtained thus far and newly obtained experimental results into temperature.

The present invention has been made based on the above-described findings. The gist of the present invention is as described below.

[1] A manufacturing method of a hot press-formed article according to one aspect of the present invention includes a heating step of heating an Al-plated steel sheet to 850° C. to 1000° C., and a forming step of forming the Al-plated steel sheet using a die to obtain a hot press-formed article after the heating step, in which the Al-plated steel sheet has a base steel sheet, an Al plating layer formed on a surface of the base steel sheet, and a coating layer formed on a surface of the Al plating layer, the coating layer is a metal layer containing at least one metal of Mg, Ca, V, Ti, and Zn, a metal oxide layer containing an oxide of one or more of Mg, Ca, V, Ti, and Zn, or a mixed layer including the metal layer and the metal oxide layer, the die has a hard layer on a surface. $HV_{Die}$ that is a surface hardness of the die at a position that the hard layer is present is HV1500 or more and HV3800 or less, and, when a temperature of the Al-plated steel sheet at a start of forming is indicated by Tm in a unit of ° C., and an average movement velocity of the die from the start of forming to arrival of a bottom dead point is indicated by V in a unit of mm/s, in the forming step, the Tm and the V satisfy the following formula (1).

$$800-(HV_{Die}/40) \leq Tm \leq 850-(V/4)-(HV_{Die}/100) \quad \text{Formula (1)}$$

[2] In the manufacturing method of a hot press-formed article according to [1], the $HV_{Die}$, the Tm, and the V may satisfy the following formula (2).

$$800-(HV_{Die}/40) \leq Tm \leq 850-(V/2)-(HV_{Die}/50) \quad \text{Formula (2)}$$

[3] In the manufacturing method of a hot press-formed article according to [1] or [2], a thickness of the coating layer may be 0.3 to 10.0 μm.

[4] In the manufacturing method of a hot press-formed article according to any one of [1] to [3], a surface temperature of the die at the start of forming may be 5° C. or higher and 180° C. or lower.

[5] A hot press-formed article according to another aspect of the present invention is composed of an Al-plated steel sheet having an Al plating layer, in which Gs60° that is glossiness regulated by JIS Z 8741: 1997 on a surface is 30 or less.

[6] In the hot press-formed article according to [5], the Gs60° may be 25 or less.

[7] The hot press-formed article according to [5] or [6] includes a coating layer on a surface of the Al plating layer, in which the coating layer may be a metal layer composed of at least one metal of Mg, Ca, V, Ti, and Zn, a metal oxide layer composed of an oxide of one or more of Mg, Ca, V, Ti, and Zn, or a mixed layer made up of the metal layer and the metal oxide layer.

[8] In the hot press-formed article according to [7], a thickness of the coating layer may be 0.3 to 10.0 μm.

Effects of the Invention

According to the above-described aspects of the present invention, a manufacturing method of a hot press-formed article for obtaining a hot press-formed article having an excellent surface external appearance while suppressing the wear of a die and a hot press-formed article having an excellent surface external appearance can be obtained.

EMBODIMENTS OF THE INVENTION

Figure 1:
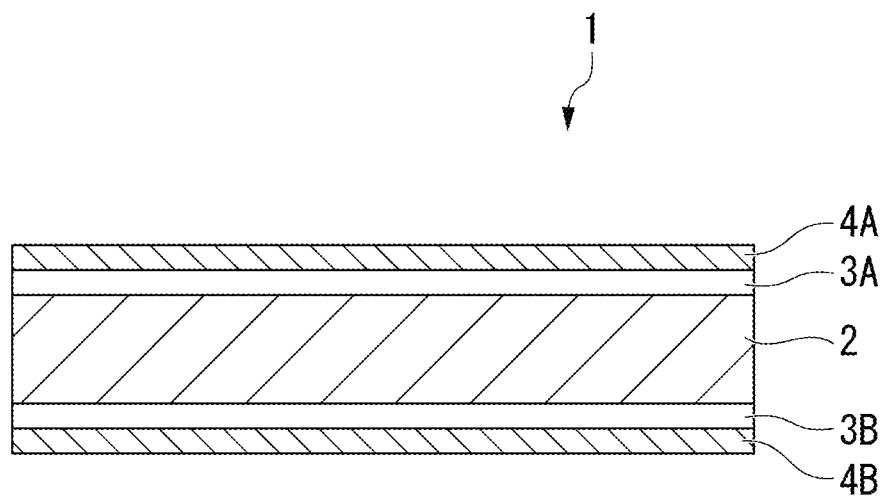
FIG. 1 is a schematic view of an Al-plated steel sheet that is used in a manufacturing method of a hot press-formed article according to the present embodiment.

A manufacturing method of a hot press-formed article according to one embodiment of the present invention (a manufacturing method of a hot press-formed article according to the present embodiment) and a hot press-formed article according to one embodiment of the present invention (a hot press-formed article according to the present embodiment) will be described.

<Manufacturing Method of Hot Press-Formed Article>

The present inventors investigated a reason for the damage of plating and a consequent increase in the glossiness of a hot press-formed article in the case of a process where an Al-plated (aluminum-plated) steel sheet is heated by a hot pressing method and press-formed immediately afterwards. As a result, it was found that the following four points are the cause.

1) After heating, a hard Al—Fe-based alloy layer that is formed on the surface of Al plating by an alloying reaction between an Al plating layer and a base metal and/or hard aluminum oxide peels off due to the surface of the Al-plated steel sheet and a die being rubbed against each other during press forming, the peeled alloy layer and aluminum oxide act like abrasive powder, and the plating on the surface of the Al-plated steel sheet is strongly damaged, 2) On the surface of the die provided with a hard membrane, when the hardness is low, the die wears, conversely, when the hardness is high, the surface of the aluminum-plated steel sheet rubbed by the die (for example, in a standing wall portion) is damaged, 3) In the case of being press-formed immediately after heating, when the temperature at the start of forming is high, the aluminum plating is softened, and thus the surface of the aluminum-plated steel sheet likely to be damaged by being rubbed by the die, 4) In the case of being press-formed, during forming after the start of the forming, the temperature of the aluminum-plated steel sheet is heat-removed by the die that came into contact with the aluminum-plated steel sheet, and the temperature of the aluminum-plated steel sheet decreases; however, in a case where the forming velocity is fast, the removal of heat is suppressed, the surface of the aluminum-plated steel sheet is rubbed by the die in a state where the temperature of the aluminum-plated steel sheet is further maintained at a high temperature, and the surface of the aluminum-plated steel sheet is more likely to be damaged.

Based on these findings, the present inventors found that the problem can be solved by covering the surface of Al plating with a layer of a metal having a low hardness or a metal oxide having a low hardness and controlling the forming temperature T (° C.) and the forming velocity V (mm/s) to satisfy a predetermined relationship with respect to the surface hardness $HV_{Die}$ of a die.

The manufacturing method of a hot press-formed article according to the present embodiment includes a heating step of heating an Al-plated steel sheet to 850° C. to 1000° C., and a forming step of forming the Al-plated steel sheet using a die to obtain a hot press-formed article after the heating step. The forming step is performed, for example, within 30 seconds after the steel sheet is taken out from a heating furnace.

In addition, the Al-plated steel sheet has a base steel sheet, an Al plating layer formed on a surface of the base steel sheet, and a coating layer formed on the surface of the Al plating layer, and the coating layer is a metal layer containing at least one metal of Mg, Ca, V, Ti, and Zn, a metal oxide layer containing an oxide of one or more of Mg. Ca, V, Ti, and Zn, or a mixed layer including the metal layer and the metal oxide layer. In addition, the die has a hard layer on the surface of the die that comes into contact with the Al-plated steel sheet in the forming step, and $HV_{Die}$ that is the surface hardness of the die at the position of the hard layer is HV1500 or more and HV3800 or less.

In addition, when the temperature (forming temperature) of the Al-plated steel sheet at the start of forming in the forming step is indicated by Tm in the unit of ° C., and the average movement velocity (forming velocity) of the die from the start of forming to the bottom dead point is indicated by V in the unit of mm/s, the Tm and the V satisfy the following formula (1).

$$800-(HV_{Die}/40) \leq Tm \leq 850-(V/4)-(HV_{Die}/100)$$ Formula (1)

In press forming, the steel sheet is drawn into the die hole of the die and formed. In a case where the edge of the die hole (also referred to as the die shoulder portion or the R portion) protrudes and curves toward the outside of the die hole, the steel sheet shrinks and flange-distorts when drawn into the die hole.

In the case of draw forming, during shrinkage and flange distortion, the thickness of the steel sheet increases toward the edge of the die hole (die shoulder portion). When the thickness of the steel sheet increases, a high contact pressure is applied to the steel sheet.

In the case of bending forming, during shrinkage and flange distortion, wrinkles are generated in the steel sheet toward the edge of the die hole (die shoulder portion). When wrinkles are generated in the steel sheet, a portion of the steel sheet that has turned into the wrinkles in the vicinity of the die hole comes into contact with the die, and a high contact pressure is applied to the contact site.

In the manufacturing method of a hot press-formed article according to the present embodiment, in hot press forming, for example, the steel sheet is blanked (punched), if necessary, and then heated to a high temperature, thereby softening the plated steel sheet. In addition, the softened plated steel sheet is press-formed using a die at a forming temperature Tm° C. and a forming velocity V mm/s, and then rapidly cooled by removing heat by holding the steel sheet in the die. As described above, in hot press forming, the plated steel sheet is once softened, whereby subsequent pressing can be easily performed. In addition, a press-formed article that has been hot press-formed is quenched by heating and cooling and is turned into a formed article having a high hardness of HV400 or more (load 1 kg-f (9.8 N)) in terms of the Vickers hardness.

[Heating Step]

In the heating step, the Al-plated steel sheet is heated to 850° C. to 1000° C. When the heating temperature is set to 850° C. or higher, which is the Ac3 point of the base steel sheet, (the base material portion of) the Al-plated steel sheet is austenitized, and it is possible to enhance the formability in the forming step, which is the next step. In addition, when the Al-plated steel sheet is heated to 850° C. or higher, it is possible to cause the martensitic transformation of the base steel sheet by rapidly cooling the Al-plated steel sheet with a die immediately afterwards, and as a result, a high tensile strength as a hot press-formed article can be obtained. When the temperature of the steel sheet lowers before the steel sheet is rapidly cooled in the die, transformation from austenite to ferrite proceeds, and desired martensitic transformation cannot be obtained even when the steel sheet is rapidly cooled with the die. Furthermore, the heating of the Al-plated steel sheet to 850° C. or higher causes an alloying reaction between the Al plating layer of the Al-plated steel sheet and the base steel sheet to proceed and also contributes to the formation of a hard Al—Fe-based alloy layer having favorable defect resistance on the surface. When the heating temperature is lower than 850° C., there is a case where ferritic transformation starts before cooling in the die and a sufficient hardness cannot be obtained in formed articles. Therefore, the heating temperature is set to 850° C. or higher. In order to keep the temperature of the steel sheet at a high temperature even in the forming step, the heating temperature is preferably 890° C. or higher, more preferably 910° C. or higher, and still more preferably 925° C. or higher.

On the other hand, when the heating temperature exceeds 1000° C., oxidization of the surface of aluminum plating (Al plating) proceeds excessively, and the wear of the die increases. In addition, such a high temperature also leads to press forming at a high temperature and makes the surface of the plating soft, which is likely to cause a defect to be generated on the material side from the die. Therefore, the heating temperature is set to 1000° C. or lower. The heating temperature is preferably 980° C. or lower and more preferably 960° C. or lower.

As a heating method, in addition to radiation heating with a normal electric furnace or radiant tube furnace, a heating method by infrared heating, energization heating, induction heating, or the like can be adopted. The heating is performed in the atmospheric atmosphere, a nitrogen atmosphere, or a combustion gas atmosphere, and the dew point of the atmosphere is not particularly limited, but the heating atmosphere preferably contains 10 vol % or more of oxygen. When 10 vol % or more of oxygen is contained, evaporation of the coating layer on the surface of the Al plating can be suppressed. More preferably, the oxygen content is 20 vol %, which is the same as in the atmospheric atmosphere, or more.

The temperature rising rate by heating is preferably 7.0° C./s or slower. In the manufacturing method of a hot press-formed article according to the present embodiment, in the Al-plated steel sheet to be heated, there is a case where the coating layer formed on the surface of the Al plating layer contains Zn (Chemical Handbook Revised 2nd Edition, Basic Edition I (Author: The Chemical Society of Japan, Publisher: Maruzen Co., Ltd., Publication date 1975): boiling point of 907° C.), Mg (same: boiling point of 1107° C.), or Ca (same: boiling point of 1487° C.), which is relatively lower than the boiling point of Al (same; 2467° C.). Therefore, the evaporation of the coating layer is promoted by a rapid temperature rise, and there is a possibility that the external appearance of a component after pressing may deteriorate. When the temperature rising rate is set to 7.0° C./s or slower, the coating layer is oxidized by oxygen in the atmosphere, and excessive evaporation is suppressed. The temperature rising rate is more preferably set to 6.0° C./s or slower.

As a method for obtaining the temperature rising rate (° C./s), a K-type thermocouple is connected to the steel sheet by spot welding, the sheet temperatures are measured while the heating temperature reaches 850° C. from a temperature Ts (° C.) in the beginning of heating, and the temperatures raised is divided by a time t (seconds) taken for the heating temperature to reach 850° C. from the sheet temperature Ts (° C.) after the beginning of heating, thereby obtaining the temperature rising rate. As a formula, the temperature rising rate is obtained by (850−Ts)/t.

(Al-Plated Steel Sheet)

The Al-plated steel sheet that is subjected to the heating step has a base steel sheet, an Al plating layer formed on the surface of the base steel sheet, and a coating layer formed on the surface of the Al plating layer. This coating layer is a metal layer containing at least one metal of Mg, Ca, V, Ti, and Zn, a metal oxide layer containing an oxide of one or more of Mg, Ca, V, Ti, and Zn, or a mixed layer including the metal layer and the metal oxide layer.

Specifically, for example, as shown in FIG. 1, an Al-plated steel sheet 1 includes Al plating layers 3A and 3B on both surfaces (the upper surface and the lower surface) of a base steel sheet 2 and a coating layer (a metal layer, a metal oxide layer, or a mixed layer thereof) 4A or 4B as the outermost layer on each of the Al plating layers 3A and 3B.

The base steel sheet 2 (steel sheet before plating) is, for example, preferably a steel sheet having a high mechanical strength (which means a variety of properties relating to mechanical distortion and fracture, for example, tensile strength, yield point, elongation, reduction in area, hardness, impact value, fatigue strength, creep strength, and the like). In the Al-plated steel sheet 1 that is used in the manufacturing method of a hot press-formed article according to the present embodiment, the chemical composition of the base steel sheet 2 is not limited; however, in the case of realizing a high mechanical strength, an example of a preferable chemical composition of the base steel sheet 2 is as described below. Hereinafter, the notation "%" regarding the chemical composition means "mass %" unless particularly otherwise described.

That is, the chemical composition of the base steel sheet 2 contains, for example, by mass %, C: 0.18% or more and 0.50% or less, Si: 2.00% or less, Mn: 0.30% or more and 5.00% or less, Cr: 2.00% or less, P: 0.100% or less. S: 0.100% or less, N: 0.0100% or less, Al: 0.500% or less, and B: 0.0002% or more and 0.0100% or less and further contains, if necessary, one or more of W: 3.00% or less, Mo: 3.00% or less. V: 2.00% or less. Ti: 0.500% or less, Nb: 0.500% or less, Ni: 5.00% or less. Cu: 3.00% or less, Co: 3.00% or less. Sn: 0.100% or less, Sb: 0.100% or less. Mg: 0.0050% or less, Ca: 0.0050% or less, REM: 0.0070% or less, and O: 0.0070% or less, and the remainder of Fe and an impurity.

The reason that the above-described chemical composition is preferable will be described.

(C: 0.18% or More and 0.50% or Less)

A hot press-formed article that is obtained by the hot stamping method is required to have a high strength of, for example, 1000 MPa or more. In this case, the structure (metallographic structure) of the hot press-formed article is required to be transformed into a structure mainly composed of martensite by rapid cooling after hot stamping.

When the carbon (C) content is less than 0.18%, the hardenability deteriorates, and the strength is insufficient. Therefore, the C content is preferably 0.18% or more. The C content is more preferably 0.20% or more and still more preferably 0.22% or more.

On the other hand, when the C content exceeds 0.50%, the toughness of the steel sheet significantly deteriorates, and the workability deteriorates. Therefore, the C content is preferably set to 0.50% or less. The C content is more preferably 0.40% or less and still more preferably 0.35% or less.

(Si: 2.00% or Less)

The lower limit of the silicon (Si) content is not particularly limited and may be 0%; however, in a case where the silicon (Si) content is less than 0.01%, the hardenability and the fatigue properties are poor. Therefore, the Si content is preferably 0.01% or more. The Si content is more preferably 0.05% or more, still more preferably 0.10% or more, and far still more preferably 0.30% or more.

On the other hand, since Si is an element that is more easily oxidized than Fe (an easily oxidizable element), when the Si content exceeds 2.00% in a continuous annealing plating line, a stable Si-based oxide film is formed on the surface of the base steel sheet during an annealing treatment, the adhesiveness of hot-dip Al plating is impaired, and there is a concern of non-plating. Therefore, the Si content is preferably set to 2.00% or less. The Si content is more preferably 1.00% or less, still more preferably 0.80% or less, and far still more preferably 0.70% or less or 0.60% or less.

(Mn: 0.30% or More and 5.00% or Less)

Manganese (Mn) is an element effective for enhancing the hardenability of the steel sheet and, furthermore, suppressing the hot embrittlement caused by S that is inevitably incorporated. In a case where the Mn content is less than 0.30%, there is a case where the hardenability deteriorates and the strength is insufficient. Therefore, the Mn content is preferably 0.30% or more. The Mn content is more preferably 0.50% or more, still more preferably 0.80% or more, and far still more preferably 1.00% or more.

On the other hand, in a case where the Mn content exceeds 5.00%, the impact characteristics after quenching deteriorate. Therefore, the Mn content is preferably set to 5.00% or less. The Mn content is more preferably 4.00% or less, still more preferably 3.00% or less, and far still more preferably 2.50% or less or 2.00% or less.

(Cr: 2.00% or Less)

The lower limit of the chromium (Cr) content is not particularly limited and may be 0%, but chromium (Cr) is an element that exhibits an effect on enhancing the hardenability of the steel sheet. In a case where the Cr content is less than 0.001%, there is a case where the above-described hardenability-improving effect cannot be obtained and the strength is insufficient. Therefore, the Cr content is preferably 0.001% or more. The Cr content is more preferably 0.05% or more and still more preferably 0.10% or more.

On the other hand, since Cr is an element that is more easily oxidized than Fe (an easily oxidizable element), in a case where the Cr content exceeds 2.00%, a stable Cr-based oxide film is formed on the surface of the base steel sheet during the annealing treatment, the adhesiveness of hot-dip Al plating is impaired, and there is a concern of non-plating. Therefore, the Cr content is preferably set to 2.00% or less. The Cr content is more preferably 1.60% or less, still more preferably 1.40% or less, and far still more preferably 1.00% or less.

(B: 0.0002% or More and 0.0100% or Less)

Boron (B) is a useful element from the viewpoint of hardenability, and, when 0.0002% or more of B is contained, the hardenability improves. Therefore, the B content is preferably set to 0.0002% or more. The B content is more preferably 0.0005% or more and still more preferably 0.0010% or more.

On the other hand, when the B content exceeds 0.0100%, the above-described hardenability-improving effect is saturated, and the manufacturability deteriorates due to the generation of a casting defect or cracks during hot rolling. Therefore, the B content is preferably set to 0.0100% or less. The B content is more preferably 0.0080% or less, still more preferably 0.0070% or less, and far still more preferably 0.0060% or less.

(Al: 0.500% or Less)

Aluminum (Al) is contained in steel as a deoxidizing agent. Since Al is an element that is more easily oxidized than Fe, in a case where the Al content exceeds 0.500%, a stable Al-based oxide film is formed on the surface of the base steel sheet during the annealing treatment, the adhesiveness of hot-dip Al plating is impaired, and there is a concern of non-plating. Therefore, the Al content is preferably set to 0.500% or less. The Al content is more preferably 0.200% or less, still more preferably 0.100% or less, and far still more preferably 0.080% or less.

On the other hand, the lower limit of the Al content is not particularly limited and may be 0%, but setting the Al content to be less than 0.001% is not economical in view of refining limits. Therefore, the Al content may be set to 0.001% or more.

(P: 0.100% or Less)

Phosphorus (P) is an element that is contained as an impurity. P is also a solid solution strengthening element and is also an element capable of increasing the strength of the steel sheet at a relatively low cost. However, in a case where the P content exceeds 0.100%, an adverse influence such as the deterioration of toughness significantly appears. Therefore, the P content is preferably set to 0.100% or less. The P content is more preferably 0.050% or less and still more preferably 0.020% or less.

On the other hand, the lower limit of the P content is not particularly limited and may be 0%, but setting the P content to be less than 0.001% is not economical in view of refining limits. Therefore, the P content may be set to 0.001% or more.

(S: 0.100% or Less)

Sulfur (S) is an element that is contained as an impurity and becomes an inclusion in steel as MnS. In a case where the S content exceeds 0.100%. MnS acts as the starting point of fracture, ductility and toughness deteriorate, and workability deteriorates. Therefore, the S content is preferably set to 0.100% or less. The S content is more preferably 0.050% or less, still more preferably 0.010% or less, and far still more preferably 0.005% or less.

On the other hand, since S is not required in the aluminum-based plated steel sheet according to the present embodiment, the lower limit of the S content is not particularly limited and may be 0%; however, the S content set to less than 0.0001% is not economical in view of refining limits. Therefore, the S content may be set to 0.0001% or more.

(N: 0.0100% or Less)

Nitrogen (N) is an element that is contained as an impurity and is preferably fixed (made into a compound) using Ti, Nb, Al, and the like from the viewpoint of stabilizing the characteristics. When the N content increases, the amount of the elements that are contained to fix N becomes large, which leads to an increase in cost. Therefore, the N content is preferably 0.0100% or less. The N content is more preferably 0.0080% or less. The N content is preferably as small as possible and may be 0%, but the N content set to less than 0.0010% is not economical in view of refining limits. Therefore, the N content may be set to 0.0010% or more.

The base steel sheet 2 of the Al-plated steel sheet 1 may have a chemical composition in which the above-described elements are contained and the remainder consists of Fe and an impurity. However, in order to further improve the characteristics, the base steel sheet 2 may further contain elements to be described below (optional elements), and the lower limits of the amounts of the optional elements of the base steel sheet 2 to be described below are all 0%.

(W and Mo: Each 3.00% or Less)

The lower limits of the tungsten (W) and molybdenum (Mo) contents are not particularly limited and may be 0%, but W and Mo are each useful elements from the viewpoint of hardenability and exhibit an effect on improvement in hardenability when the contents thereof are 0.01% or more. In the case of obtaining the effect, the W content and the Mo content are each preferably set to 0.01% or more. The W content and the Mo content are each more preferably 0.05% or more.

On the other hand, in a case where the W and Mo contents each exceed 3.00%, the above-described effect is saturated, and the cost also increases. Therefore, the W content and the Mo content are preferably 3.00% or less. The W content and the Mo content are each more preferably 1.00% or less.

(V: 2.00% or Less)

The Lower limit of the vanadium (V) content is not particularly limited and may be 0%, but V is a useful element from the viewpoint of hardenability and exhibits an effect on improvement in hardenability when the content thereof is 0.01% or more. Therefore, in the case of obtaining the effect, the V content is preferably set to 0.01% or more. The V content is more preferably 0.05% or more.

On the other hand, in a case where the V content exceeds 2.00%, the above-described effect is saturated, and the cost also increases. Therefore, the V content is preferably set to 2.00% or less. The V content is more preferably 1.00% or less.

(Ti: 0.500% or Less)

The lower limit of the titanium (Ti) content is not particularly limited and may be 0%, but Ti is an element effective for fixing N and may be contained. In the case of obtaining this effect, it is preferable to contain Ti about 3.4 times or more the N content by mass %. Since the N content often becomes about 10 ppm (0.001%) even when attempted to be reduced, the Ti content is preferably 0.005% or more. The Ti content is more preferably 0.010% or more.

On the other hand, when the Ti content becomes excessive, the hardenability deteriorates, and the strength decreases. Such deterioration of the hardenability and the strength become significant when the T content exceeds 0.500%. Therefore, the Ti content is preferably set to 0.500% or less. The Ti content is more preferably 0.100% or less.

(Nb: 0.500% or Less)

The lower limit of the niobium (Nb) content is not particularly limited and may be 0%, but Nb is an element effective for fixing N and may be contained. In the case of obtaining this effect, it is preferable to contain Nb about 6.6 times or more the N content by mass %. Since the N content often becomes about 10 ppm (0.001%) even when attempted to be reduced, the Nb content is preferably 0.006% or more. The Nb content is more preferably 0.010% or more.

On the other hand, when the Nb content becomes excessive, the hardenability deteriorates, and the strength decreases. Since such deterioration of the hardenability and the strength become significant when the Nb content exceeds 0.500%, the Nb content is preferably set to 0.500% or less. The Nb content is more preferably 0.100% or less.

In addition, even when Ni, Cu, Co, Sn, Sb, Mg, Ca, REM, O, and the like are contained as the chemical composition of the base steel sheet 2, the effects in the present embodiment are not impaired as long as the contents are in ranges of upper limits to be described below or lower.

(Ni: 5.00% or Less)

The lower limit of the nickel (Ni) content is not particularly limited and may be 0%, but Ni is a useful element for improving low temperature toughness, leading to improvement in impact resistance, in addition to hardenability. In the case of obtaining the above-described effect, the Ni content is preferably set to 0.01% or more.

On the other hand, when the Ni content exceeds 5.00%, the above-described effect is saturated, and the cost increases. Therefore, the Ni content is preferably set to 5.00% or less.

(Cu and Co: 3.00% or Less)

The lower limit of the amount of each of copper (Cu) and cobalt (Co) is not particularly limited and may be 0%, but both Cu and Co are both useful elements for improving toughness in addition to hardenability. In the case of obtaining the effect, the Cu content and the Co content are each preferably set to 0.01% or more.

On the other hand, when the amount of each of Cu and Co exceeds 3.00%, the above-described effect is saturated, and the cost increases. In addition, when excessively contained, Cu and Co both cause the deterioration of cast piece properties or the generation of cracking or flaws during hot rolling. Therefore, the Cu content and the Co content are each preferably set to 3.00% or less.

(Sn and Sb: 0.100% or Less)

The lower limits of the tin (Sn) and antimony (Sb) contents are not particularly limited and may be each 0%, but Sn and Sb are both elements effective for improving the wettability and adhesion of plating. In the case of obtaining this effect, 0.001% or more of at least any one of Sn and Sb is preferably contained.

On the other hand, in a case where more than 0.100% of at least any one of Sn or Sb is contained, a defect is likely to be generated during manufacturing or the toughness deteriorates. Therefore, the Sn content and the Sb content are each preferably 0.100% or less.

(Mg and Ca: 0.0050% or Less)

Mg and Ca are both elements that are contained as an impurity, and the lower limits of the Mg content and the Ca content are not particularly limited and may be each set to 0%. When contained, Mg and Ca both have an effect on suppressing an inclusion in the base metal in some cases and may be contained, but act as the starting point of fracture when contained in a large quantity. Therefore, the Mg content and the Ca content are each preferably 0.0050% or less.

(REM and O: 0.0070% or Less)

REM and O are not essential elements and are contained in, for example, steel as an impurity. REM and O are elements that cause the deterioration of the characteristics of the steel sheet by forming an oxide and acting as the starting point of fracture. In addition, there is a case where an oxide present in the vicinity of the surface of the steel sheet causes a surface defect and deteriorates the external appearance quality. Therefore, the REM content and the O content are preferably as small as possible. In particular, when the REM content and the O content are more than 0.0070%, the characteristics significantly deteriorate, and thus the REM content and the O content are each preferably 0.0070% or less. The lower limits of the REM content and O contents are not particularly limited and may be 0%, but the lower limits are 0.0005% in actual operation in consideration of refining, and thus the substantial lower limits of the REM content and the O content are each 0.0005%.

(Regarding Other Components)

Other components are not particularly regulated, but there is a case where elements such as Zr and As are incorporated from scrap. However, as long as the amount of the elements incorporated is in a normal range, the characteristics (mechanical strength and the like) of the base steel sheet 2 according to the present embodiment are not affected.

The remainder of the chemical composition of the base steel sheet 2 is Fe and an impurity. The impurity means a component that is incorporated from a raw material such as an ore or a scrap or from a variety of causes in manufacturing steps during the industrial manufacturing of a steel material and is allowed to be contained as long as the impurity does not adversely affect the Al-plated steel sheet 1 according to the present embodiment.

(Al Plating Layer)

In the Al-plated steel sheet 1 that is used in the manufacturing method of a hot press-formed article according to the present embodiment, the Al plating layers 3A and 3B are plating layers containing, by mass %, 50% or more of Al in the composition. Elements other than Al are not particularly limited, but Si may be positively contained for the following reasons.

When Si is contained in the Al plating layers 3A and 3B, Al—Fe—Si alloy layers are formed at the interfaces between the Al plating layers 3A and 3B and the base steel sheet 2 (base metal), which makes it possible to suppress the formation of a brittle Al—Fe alloy layer that is formed during hot-dip plating. In a case where the Si content is less than 3% by mass %, the Al—Fe alloy layer grows thick at the stage of performing Al plating, cracking of the plating layers is promoted during processing, and there is a possibility that the corrosion resistance is adversely affected.

On the other hand, in a case where the Si content exceeds 15% by mass %, conversely, the volume percentage of the layers containing Si increases, and there is a concern that the workability and corrosion resistance of the plating layers may deteriorate. Therefore, the Si content in the Al plating layer is preferably set to 3% to 15%.

As a manufacturing method of an Al-plated steel sheet by treating the Al plating to the base steel sheet, a method in which a slab containing chemical composition adjusted by normal pig iron making and steel making is subjected to normal hot rolling, pickling, and cold rolling and subjected to Sendzimir-type continuous annealing, immersion in a hot-dip Al plating bath, and the adjustment of the thicknesses of the Al plating layers by wiping, thereby manufacturing an Al-plated steel sheet is an exemplary example.

The Al plating layers 3A and 3B prevent the corrosion of the steel sheet in the case of being used as a vehicle component. In addition, even when the Al-plated steel sheet 1 is heated to a high temperature in the case of being processed by hot press forming, in the Al plating layers 3A and 3B, there is no case where scale (iron oxide) is formed on the surface of the base metal. When the Al plating layers 3A and 3B prevent the formation of scale, it is possible to omit a step of removing scale, a surface cleaning step, a surface treatment step, and the like, and the productivity of the hot press-formed article improves. The iron oxide, which is scale, grows hard and coarse when heated and thus also causes the die to wear. In addition, the Al plating layers 3A and 3B have higher boiling point and melting point than plating layers composed of other metal-based materials (for example, Zn-based materials). Therefore, when the Al-plated steel sheet is formed by hot press forming, the Al plating layers are less likely to evaporate, and hot press forming at a high temperature becomes possible. Therefore, the formability in hot press forming is further enhanced, and it becomes possible to easily form the Al-plated steel sheet.

Generally, there is a case where an Al oxide coating having a thickness of 0.01 to 0.1 μm is present on the surface of the Al plating layer of the Al-plated steel sheet 1. There is a case where the thickness of this Al oxide coating increases up to 0.01 to 0.5 μm after hot pressing. The reason for the thickness of the Al oxide coating to increase after hot pressing is that the Al oxide coating is oxidized by oxygen or water vapor in the atmosphere after hot press forming.

The formation of this Al oxide coating and the increase in the thickness are suppressed by the formation of a metal layer or a metal oxide layer on the surface of the Al plating layer. However, in a case where coating layers 4A and 4B including a metal layer or a metal oxide layer are present on the Al plating layers 3A and 3B as in the Al-plated steel sheet 1 according to the present embodiment, the formation of an Al oxide coating is suppressed on the outermost surface side, but there is a case where a reaction is caused at the interfaces between the metal layer and/or the metal oxide layer and the Al plating layers and a metal oxide containing Al is formed on the metal oxide layer after hot pressing.

Al in the Al plating layers may be alloyed with Fe in the steel sheet by heating during hot-dip plating and hot press forming. Therefore, it is not always true that the Al plating layer is formed as a single layer having a constant composition, and the Al plating layer includes a partially alloyed layer (alloy layer). The alloy layer is hard and brittle and thus causes die wear during hot forming. However, when a metal layer or a metal oxide layer is formed on the surface, it is possible to suppress this alloy layer coming into contact with the die and wearing the die. Furthermore, a defect that is generated in the alloy layer from the die is suppressed, and the deterioration of the external appearance is suppressed.

The thicknesses of the Al plating layers 3A and 3B are preferably 10 μm or more and 60 μm or less. When the thicknesses of the Al plating layers 3A and 3B are less than 10 μm, iron scale is formed on the base steel sheet 2 and the wear of the die is promoted, the thicknesses of the Al plating layers 3A and 3B are more preferably 12 μm or more and still more preferably 15 μm or more.

On the other hand, when the adhesion amount of the Al plating layers 3A and 3B exceeds 60 μm, the plating receives a large shear stress, and a large amount of Al plating exfoliates. In this case, the die is damaged, and the wear of the die is promoted. The thicknesses of the Al plating layers 3A and 3B are preferably 55 μm or less and more preferably 50 μm or less.

The thicknesses of the Al plating layers 3A and 3B can be obtained by collecting a sample such that a cross section in the thickness direction can be observed, polishing the cross section, and then observing the cross section with an optical microscope at a magnification of 1.000 times.

(Coating Layer)

In the Al-plated steel sheet 1 that is used in the manufacturing method of a hot press-formed article according to the present embodiment, metal layers, metal oxide layers, or mixed layers thereof are provided on the Al plating layers 3A and 3B as the coating layers 4A and 4B as the outermost layers.

These coating layers 4A and 4B are extremely important for suppressing the wear of the die and obtaining a beautiful external appearance of a hot press-formed article.

As described above, in a case where the Al-plated steel sheet 1 is hot-pressed, one of the reasons for the plating to be damaged is the presence of a hard Al—Fe alloy layer and aluminum oxide that is formed on the surface of the Al plating during heating for hot stamping.

Therefore, in the manufacturing method of a hot press-formed article according to the present embodiment, metal layers containing at least one metal of Mg, Ca, V, Ti, and Zn, metal oxide layers containing an oxide of one or more of Mg, Ca, V, Ti, and Zn, or mixed layers including the metal layer and the metal oxide layer are formed on the surfaces of the Al plating layers 3A and 3B so as to cover the surfaces of the Al plating layers 3A and 3B. The reason for the metal layer or the metal oxide layer to be effective is not clear, but a possibility of a substance with a low Morse hardness (Chemical Handbook Basic Edition p 475, Maruzen Co., Ltd., published in 1966) being effective is conceivable. For example, Mg (Morse hardness 2.0), Ca (same 1.5), and Zn (same 2.5) are all lower than Al (same 2.9). In addition, MgO (Morse hardness 5.5 to 6), $CaCO_3$ (same 3), ZnO (same 4.5 to 5), and $TiO_2$ (Morse hardness: 5.5 to 7.5) are lower than Al oxide (same 9). However, it is not always true that wear is solved by this alone, and it is conceivable that, for example, in the case of a metal, the melting point may have an influence, and, in the case of an oxide, the size or the like may also have an influence. The metal oxide that is contained in the coating layer, which is mentioned in the present embodiment, includes not only oxides of the above-described metals but also hydroxides and the carbon oxides of the above-described metals. This is because most of hydroxides and carbon oxides are considered to be converted into oxides after being heated in a heating furnace.

As the metal and metal oxide that configure the metal layer and the metal oxide layer that are included in the coating layer, metallic Zn, metallic Mg, ZnO, or MgO is preferable from the viewpoint of the cost and easy procurement.

Incidentally, from the viewpoint of suppressing the evaporation of the coating layer in the heating step of hot pressing, a coating layer that is not a layer of Zn or ZnO alone, which has a relatively low boiling point, and includes any of a metal layer containing at least one metal of Mg, Ca, V, and Ti, a metal oxide layer containing an oxide of one or more of Mg, Ca, V, and Ti, or a mixed layer thereof is preferable.

In the present embodiment, the metal layer, the metal oxide layer, or the mixed layer including the metal layer and the metal oxide layer refers to a layer in which a total of 8 mass % or more of at least one element of Mg, Ca, V, Ti, and Zn is contained.

The coating layer may be a mixed layer of a metal layer and a metal oxide layer in which a part of the metal layer has turned into an oxide. In addition, the metal layer or the metal oxide layer may be a layer composed of the above-described metal or metal oxide, but may also be a layer in which a metal or a metal oxide and a resin are mixed. Since the resin plays a role of a binder, when the resin is mixed, it is possible to strongly attach the metal layer or the metal oxide layer to the surface of the Al plating. The resin mentioned herein means a compound mainly composed of C or a compound containing H, O, N, and S and being mainly composed of C. Even when the resin is mixed, since the resin is easily combusted in a heating furnace and released as carbon dioxide and disappears from the coating layer after press forming, the resin has a small influence on the characteristics of the metal layer or the metal oxide layer.

In the heating step during hot press forming, the Al-plated steel sheet 1 is heated in an atmosphere containing oxygen or water vapor. Therefore, when the Al-plated steel sheet is taken out from the heating furnace and then hot-press-formed and after the Al-plated steel sheet is hot-pressed (when the Al-plated steel sheet has turned into a hot press-formed article), a part or all of the metal that was not an oxide before hot pressing is oxidized, and the metal layer turns into a mixed layer of the metal layer and a metal oxide layer or a metal oxide layer. For example, a metallic Zn layer partially or wholly turns into a ZnO layer.

A forming method of the coating layers 4A and 4B is not particularly limited, and, for example, when the coating layer is a metal layer, the coating layer can be formed on the Al-plated steel sheet by precipitation by an electro plating method or by vapor deposition by a physical vapor deposition method. When the coating layer is a metal oxide layer, for example, the coating layer can be formed by a method in which the metal layer formed on the Al-plated steel sheet is heated in the air for a short period of time to be oxidized or, additionally, can be formed by, for example, dispersing a commercially available metal oxide sol in water applying the water dispersion liquid to the Al-plated steel sheet, and drying moisture to form a membrane. At this time, it is also possible to mix a resin with the water dispersion liquid.

When the thicknesses of the coating layers 4A and 4B are set to 0.3 μm or more, the wear of the die is suppressed, and furthermore, a beautiful external appearance of a hot press-formed article can be obtained after hot forming (a low glossiness can be obtained). Therefore, the thicknesses of the coating layers 4A and 4B are preferably set to 0.3 μm or more. The thicknesses are more preferably 0.4 μm or more and still more preferably 0.5 μm or more.

On the other hand, when the thickness of the coating layer exceeds 10.0 μm, there is a case where the external appearance is impaired by the metal layer or the metal oxide layer itself. Therefore, the thickness of the coating layer is preferably set to 10.0 μm or less. The thickness of the coating layer is more preferably 7.0 μm or less and still more preferably 5.0 μm or less.

The thicknesses of the coating layers 4A and 4B (the metal layers and/or the metal oxide layers) can be measured by embedding the sample in a resin, polishing the sample, and observing cross sections in the thickness direction using a scanning electron microscope (SEM) at a magnification of 1000 times to 30000 times. The coating layers 4A and 4B, which are the metal layers, the metal oxide layers, or mixed layers including the metal layer and the metal oxide layer, refer to layers in which the content ratio of at least one element of Mg, Ca, V, Ti, and Zn is 8 mass % or more in total, and the content ratio is obtained by analyzing the cross section with an electron probe micro analyzer (EPMA). If necessary, the surface of the material may be observed after being deposited with gold before the material is embedded in order to clarify the boundary between the coating layer and the embedding resin.

[Forming Step]

In the forming step, the heated Al-plated steel sheet 1 is formed using a die after the completion of the heating step, thereby obtaining a hot press-formed article. When the time taken from the completion of the heating step to the start of forming is longer than 30 seconds, there is a case where the base metal of the steel sheet austenitized by heating undergoes ferritic transformation and it becomes impossible to obtain a high-strength martensite structure after pressing. Therefore, the time taken from the completion of the heating step to the start of forming is preferably set to 30 seconds or shorter. Since the Al-plated steel sheet is preferably formed as soon as possible, it is not necessary to limit the lower limit; however, when facility restrictions such as the transportation speed from the heating furnace to a press machine and the descending speed of a die of the press machine and the like are taken into account, the time may be set to 3 seconds or longer. However, the time taken until forming is controlled for the purpose of ensuring the temperature of the Al-plated steel sheet.

(Die)

As a die that is used for forming, it is not necessary to use a die that is particularly limited by use. General tool steel represented by SKD11 and SKD61 of JIS (JIS G 4404: 2015), high-speed steel, and the like are exemplary examples.

However, the die that is used in the present embodiment has a hard layer on the surface of the die that comes into contact with the Al-plated steel sheet. In addition, $HV_{Die}$, which is the surface hardness of the die at the position of the hard layer, is HV1500 or more and HV3800 or less.

This hard layer is extremely important for suppressing the wear of the die and obtaining a beautiful external appearance of a hot press-formed article.

In order to further suppress the wear, the hard layer is preferably formed in a thickness of 1.0 μm or more. The upper limit of the thickness of the hard layer is preferably 20 μm or less in order to suppress an excessive increase in the internal stress or toughness deterioration of the hard layer.

In the manufacturing method of a hot press-formed article according to the present embodiment, the upper die and the lower die of the die relatively move in a constant direction, and the steel sheet installed between the upper die and the lower die is drawn into the die hole of the die and formed by this movement. In such press forming, a surface of the die in a direction parallel to the direction in which the die (the upper die and the lower die) relatively moves (generally, the vertical direction) comes into contact with the steel sheet to be processed and is slid. On the surface in the direction parallel to the relative movement direction, for example, the surface of the R portion of the die is in contact with the standing wall portion of the hot press-formed article, and additional examples include the surface of a wrinkle-suppressing flange portion of the die, in the case of a beaded die, the surface of the bead head top portion, and the like.

When the hardness $HV_{Die}$ of the hard layer that is included in the die is HV1500 or more, wear on the sliding surface (the surface that slides in contact with the steel sheet) of the die during hot press forming is suppressed. At a hardness of less than HV1500, the die wears. For example, the SKD11 or SKD61 material is HV500 to HV1000, generally, in the case of performing a nitriding treatment, the hardness is HV600 to HV1400, and the die wears. Therefore, $HV_{Die}$ is set to HV1500 or more. $HV_{Die}$ is preferably HV2000 or more and more preferably HV2500 or more. The upper limit is not provided for the surface hardness, but the hard layer becomes brittle in the case of being excessively hard, and a phenomenon in which the hard layer and the base metal of the die exfoliate occurs. Furthermore, the die damages the surface of the Al-plated steel sheet during hot pressing, and the external appearance is degraded. Therefore, $HV_{Die}$ is set to HV3800 or less. $HV_{Die}$ is preferably HV3600 or less and more preferably HV3400 or less.

The surface hardness $HV_{Die}$ of the die is hardness that is measured at a test load of 10 g-f to 25 g-f (0.098 N to 0.245 N) in the Vickers hardness testing method specified by JIS Z 2244: 2009. As a micro Vickers tester for measuring hardness, HM-211 manufactured by Mitutoyo Corporation can be used. Regarding the measurement of the hardness, the Micro Vickers indenter is indented at 2 or more points separated by 30 μm or more, and the diagonal length of the indentation is observed with SEM, thereby obtaining the hardness.

The material or forming method of the hard layer that is formed in the die is not limited as long as the hard layer satisfies $HV_{Die} \geq HV1500$.

Examples thereof include a hard coating layer (deposited film) by the physical vapor deposition method (PVD method), and specific examples include a nitride film, a carbide film, and a carbonitride film, containing one or more selected from Ti, Cr, and Al as main components, a diamond-like carbon (DLC) film, and the like.

Among them, the deposited film as the hard coating layer is preferably a film containing Ti or Cr or combination thereof. For example, the deposited film is preferably a film in which the metal element portion is any of a nitride, a carbide, and a carbonitride containing one or more selected from Ti, Cr, and Al as main components. Furthermore, the deposited film is more preferably a film in which the metal element portion is any of a nitride, a carbide, and a carbonitride containing Ti or Cr as a main component. The hardness $HV_{Die}$ of the PVD coating in which the metal element portion contains Ti, Cr, or Al is between 2000 and 4000. In the case of using diamond-like carbon, the hardness $HV_{Die}$ of the PVD coating is between 5000 and 8000.

In the present embodiment, as a forming method of the hard layer in the die, a forming method of a deposited film by physical vapor deposition is an exemplary example. The type of the physical vapor deposition method is not particularly limited. As the physical vapor deposition method, for example, an arc ion plating method and a sputtering method are desirable. In addition, a chemical vapor deposition (CVD) method may also be used.

For example, a variety of metal targets and reaction gases ($N_2$ gas, $CH_4$ gas, and the like) that are the evaporation sources of metal components are used, and the temperature and the gas pressure are adjusted to apply a bias voltage, whereby a PVD film can be formed on the surface of the base metal of the die.

Before the formation of the hard coating layer (deposited film) by the physical vapor deposition method (PVD method) in the die, a nitriding layer that acts as an underlying layer is preferably formed (a surface-hardening treatment using diffusion called a nitriding treatment). Here, the nitriding layer is generally less than HV1500 and is not included in the hard layer of the die necessary for wear resistance in the present embodiment.

The nitriding layer is formed by performing, for example, an ion nitriding treatment, that is, performing an ion nitriding treatment by adjusting the temperature in a $N_2$ and $H_2$ gas atmosphere having a predetermined concentration on the base metal of the die.

At this time, the compound layer such as the nitriding layer called a white layer that is formed by the nitriding treatment causes the deterioration of the adhesion, and thus it is desirable to prevent the formation of the compound layer by the control of the treatment conditions or remove the compound layer by polishing or the like.

In the manufacturing method of a hot press-formed article according to the present embodiment, in hot press forming, when the temperature of the Al-plated steel sheet 1 at the start of forming is indicated by Tm in the unit of ° C., and the average movement velocity of the die from the start of forming to the bottom dead point is indicated by V in the unit of mm/s, the forming is performed such that Tm and V satisfy the following formula (1) in accordance with $HV_{Die}$.

$$800-(HV_{Die}/40) \leq Tm \leq 850-(V/4)-(HV_{Die}/100) \quad \text{Formula (1)}$$

this formula (1) is extremely important for suppressing the wear of the die and obtaining a beautiful external appearance of a hot press-formed article.

The temperature (forming temperature: Tm) (° C.) of the Al-plated steel sheet 1 at the start of forming needs to be $((850-V/4)-(HV_{Die}/00))$ or less. When the forming temperature is higher than $((850-V/4)-(HV_{Die}/100))$, the surfaces of the Al plating layers 3A and 3B on the surface of the Al-plated steel sheet 1 become soft and are rubbed against the die, which makes a defect likely to be generated and degrades the external appearance of a hot press-formed article after forming (the quality of the external appearance deteriorates). The average movement velocity (forming velocity: V) of the die from the start of forming to the arrival of the bottom dead point can be obtained from a relationship of V=S/t using a time t (seconds) taken for the movement of both the Al-plated steel sheet 1 and the die to stop from the start of forming (generally, also called the bottom dead point) and a movement distance S (mm) of the die while the movement of both the Al-plated steel sheet and the die stops from the start of forming. The reason for the external appearance of the hot press-formed article to depend on the average movement velocity V (forming velocity) of the die during forming is that, as the forming velocity becomes faster, the removal of heat from the steel sheet by the contact with the die is further suppressed, it is more likely that the steel sheet receives an impact from the die at a high temperature and a defect is generated, and the external appearance is more likely to deteriorate. Here, the start of forming refers to a timing at which the moving die comes into contact with the Al-plated steel sheet.

In addition, since an appropriate temperature for suppressing the damage on the material (Al-plated steel sheet) side is also affected by the hardness of the die surface, Tm and V preferably satisfy the formula (2).

$$800-(HV_{Die}/40) \leq Tm \leq 850-(V/2)-(HV_{Die}/50) \quad \text{Formula (2)}$$

That is, the temperature (forming temperature: Tm) (° C.) of the Al-plated steel sheet at the start of forming is preferably $((850-V/2)-(HV_{Die}/50))$ or lower. This is because the surface of a press-formed article is more likely to be damaged in a case where the hardness $HV_{Die}$ of the surface of the die is high, and thus a more beautiful hot press-formed article can be obtained by further suppressing the forming temperature in accordance with $HV_{Die}$.

On the other hand, when the forming temperature Tm (° C.) is lower than $(800-(HV_{Die}/40))$, the surface of the steel sheet becomes hard, and thus the die and the steel sheet are strongly rubbed against each other during pressing, and the die wears. Therefore, the forming temperature (° C.) is set to $(800-(HV_{Die}/40))$ or higher. The forming temperature Tm (° C.) is preferably $(805-(HV_{Die}/40))$ or higher and more preferably $(810-(HV_{Die}/40))$ or higher.

The average movement velocity V (mm/s) of the die from the start of forming to the bottom dead point is not particularly limited as long as the formula (1) and the formula (2) are satisfied. Heat of the formed article is removed by the contact with the die; however, when the average movement velocity is set to be slow, the amount of heat removed becomes large, and the formed article comes into contact with the die at a lower temperature, and thus the damage of the surface of the formed article decreases, and the glossiness decreases. Therefore, in terms of the external appearance, the average movement velocity (forming velocity) is preferably 95 mm/s or slower and more preferably 85 mm/s or slower. However, when the average movement velocity is too slow, heat is excessively removed from the formed article, and the wear of the die is promoted due to the impairing of the martensitic transformation of the material and the surface of the material becoming hard. Therefore, the average movement velocity (forming velocity) is preferably 15 mm/s or faster and more preferably 25 mm/s or faster. The average movement velocity V (mm/s) is obtained by dividing the movement distance (mm) of the die by the time (seconds) taken from the start of forming (when the die is initiated) to the bottom dead point (when the movement of the die and the press-formed article stops).

As a measurement method of the temperature (forming temperature: Tm) (° C.) of the Al-plated steel sheet 1 at the start of forming, the temperature can be measured with a radiation-type thermometer or by attaching a thermocouple to the Al-plated steel sheet 1. Generally, in a case where a thermocouple is attached, a portion to which the thermocouple is attached becomes convex and impairs hot press forming, and thus a method in which the thermocouple is attached to the side surface of the end portion of the steel sheet of the Al-plated steel sheet (a surface perpendicular to the surface where the Al plating layer is present) may be used. The forming temperature Tm (° C.) is not particularly limited as long as the formula (1) and the formula (2) are satisfied, but is preferably 550° C., or higher, more preferably 600° C., or higher, and still more preferably 650° C., or higher from the viewpoint of increasing the mechanical strength of the press-formed article by causing the material to undergo martensitic transformation during hot pressing. On the other hand, from the viewpoint of ensuring the movement time from the heating furnace to press forming, the forming temperature Tm (° C.) is preferably 850° C., or lower, more preferably 830° C., or lower, and still more preferably 810° C. or lower.

The surface temperature of the die at the start of forming is preferably 180° C. or lower. When the die side is damaged, unevenness is formed, damage on the material side increases, and the external appearance deteriorates; however, when the surface temperature of the die is set to 180° C., or lower, the damage of the die can be more stably suppressed. The surface temperature of the die at the start of forming is more preferably 170° C., or lower and still more preferably 160° C., or lower. The lower limit of the surface temperature of the die is not particularly determined, but is preferably 5° C., or higher. In addition, the die temperature increases due to the contact with the Al-plated steel sheet heated during forming or, when forming is performed continuously, the heat is stored in the die, and the die temperature gradually increases, and thus the lower limit is more preferably 20° C., or higher and still more preferably 50° C., or higher.

The surface temperature of the die can be measured by attaching a thermocouple to the die by spot welding.

The movement distance of the die is preferably 150 mm or less. The movement distance mentioned herein means the movement distance of the die in the direction in which the die (the upper die and the lower die) relatively moves while the die and the Al-plated steel sheet come into contact with each for the first time and the descending of the die stops upon the end of forming (generally also referred to as the bottom dead point) during hot press forming. As the movement distance of the die becomes longer, the distance of the Al-plated steel sheet and the die being rubbed against each other and sliding becomes longer. As the sliding distance increases, the Al—Fe alloy layer or Al oxide in the exfoliated plating starts to act like an abrasive, and the external appearance gradually deteriorates. When the movement distance exceeds 150 mm, the external appearance significantly deteriorates. The movement distance of the die is more preferably 130 mm or less and still more preferably 110 mm or less.

The metal material of the base metal of the die is not particularly determined, and well-known metallic materials, for example, cold die steel, hot die steel, high speed steel, cemented carbide, and the like can be used. Regarding this, improved metal kinds that have been proposed as a kind of steel that can be used in conventional dies, including standard metal types (kinds of steel) by JIS or the like can also be applied.

<Hot Press-Formed Article>

The hot press-formed article according to the present embodiment is a hot press-formed article composed of an Al-plated steel sheet having an Al plating layer, in which the glossiness (Gs60°) that is regulated by JIS Z 8741: 1997 on the surface is 30 or less.

The hot press-formed article according to the present embodiment can be obtained by the above-described manufacturing method of a hot press-formed article according to the present embodiment. In the present embodiment, the hot press-formed article does not necessarily refer only to a formed article formed by hot pressing accompanying the distortion of the steel sheet shape of an Al-plated steel sheet and also includes Al-plated steel sheets that have been slid after heating or Al-plated steel sheets that have been sandwiched by the die after heating and received pressure.

The hot press-formed article according to the present embodiment is obtained by forming an Al-plated steel sheet including a metal layer composed of at least one metal of Mg, Ca, V, Ti, and Zn, a metal oxide layer composed of an oxide of Mg, Ca, V, Ti, and Zn, or a mixed layer made up of the metal layer and the metal oxide layer formed on the surface of the sliding surface that comes into contact with the die at least during hot pressing by hot pressing.

Therefore, on the surface of the hot press-formed article according to the present embodiment, the glossiness (Gs60°) regulated in JIS Z 8741: 1997 is 30 or less, and the surface external appearance is excellent. The glossiness is preferably 25 or less.

The glossiness may be measured at the standing wall portion (sliding portion) where the external appearance is most likely to deteriorate.

In addition, the hot press-formed article according to the present embodiment preferably has a coating layer composed of a metal layer of at least one of Ca, V, Ti, and Zn, a metal oxide layer of at least one of Mg, Ca, V, Ti, and Zn, or a mixed layer of the metal layer and the metal oxide layer on the surface of the Al plating layer in order to obtain the above-described glossiness. In addition, the thickness of the coating layer is preferably 0.3 to 10.0 μm.

EXAMPLES

Example 1

Al plating was provided by a Sendzimir method on both surfaces of a cold-rolled steel sheet having a chemical composition (unit: mass %, remainder: Fe and an impurity) shown in Table 1 and having a sheet thickness of 1.4 mm. The annealing temperature before immersion in a plating bath was set to about 750° C. The Al plating bath contained 9.5 mass % of Si and additionally contained Fe that was eluted from the cold-rolled steel sheet, and the remainder was Al. The thickness (weight per unit area) of an Al plating layer after plating was adjusted by a gas wiping method, and the thicknesses (weights per unit area) of the Al plating layers formed on both surfaces of the cold-rolled steel sheet were both set to 20 μm, and then cooling were performed.

After that, an operation by which the Al plating layers on both surfaces were partially coated with each of a Zn oxide,

TABLE 1

| (mass %) (remainder: Fe and impurity) | | | | | | | | | |
|---|---|---|---|---|---|---|---|---|---|
| C | Si | Mn | P | S | Al | Cr | Ti | B | N |
| 0.22 | 0.27 | 1.23 | 0.017 | 0.003 | 0.029 | 0.19 | 0.024 | 0.0023 | 0.0030 |

TABLE 2

| (mass %) (remainder: Fe and impurity) | | | | | | | | | | | | | | | |
|---|---|---|---|---|---|---|---|---|---|---|---|---|---|---|---|
| C | Si | Mn | P | S | Al | Cr | Ti | B | N | Ni | Cn | Nb | Sn | Ca | REM | O |
| 0.23 | 0.25 | 1.19 | 0.015 | 0.003 | 0.022 | 0.21 | 0.025 | 0.0030 | 0.0030 | 0.20 | 0.20 | 0.013 | 0.010 | 0.0022 | 0.0012 | 0.0025 | a Ti oxide, a V oxide, a Mg oxide, and/or a Ca oxide of chemicals (manufactured by Sigma-Aldrich Japan. C. I. Kasei Co., Ltd., Taki Chemical Co., Ltd., TECNAN Co., Ltd., Tateho Chemical Industries Co., Ltd., and Suzuki Engineering Co., Ltd.) with a roll coater and baked at about 80° C. was performed, and oxide coatings of Mg, Ca, V, Ti. and/or Zn were formed on both surfaces. In some of the Al plating layers, the same mass % of a polyurethane resin was mixed with the Zn oxide, and the Al plating layers were coated and baked, thereby forming coatings. In all of the coating layers, the total of the content ratio of at least one element of Mg, Ca, V, Ti, and Zn was 8 mass % or more.

Al-plated steel sheets A1 to A35 shown in Table 3-1 to Table 3-4 were obtained as described above.

Example 2

Al plating was provided by a Sendzimir method on both surfaces of a cold-rolled steel sheet having a chemical composition (unit: mass %, remainder: Fe and an impurity) shown in Table 2 and having a sheet thickness of 1.4 mm. The annealing temperature before immersion in a plating bath was set to about 750° C., the Al plating bath contained 9.5 mass % of Si and additionally contained Fe that was eluted from the cold-rolled steel sheet, and the remainder was Al. The thickness (weight per unit area) of an Al plating layer after plating was adjusted by a gas wiping method, and the thicknesses (weights per unit area) of the Al plating layers formed on both surfaces of the cold-rolled steel sheet were both set to 30 μm, and then the Al plating layers were cooled. In addition, on both surfaces of the Al plating layers, metal layers of Mg, Ca, V, Ti, and Zn, metal layers in which Zn and Mg were mixed, and metal layers in which Zn and V were mixed were formed by an ion plating method. In addition, in some of the Al plating layers, the metal layers were formed on both surfaces of the Al plating layers in the same manner and then heated in the air at 700° C. for 4 minutes, thereby oxidizing some of the metal layers to form mixed layers of an oxide layer and the metal oxide layer on the Al plating layers. In all of the coating layers, the total of the content of at least one element of Mg, Ca, V, Ti, and Zn was 8 mass % or more.

Al-plated steel sheets A36 to A49 shown in Table 3-1 to Table 3-4 were obtained as described above.

At the same time, Al-plated steel sheets A50 and A51 in which neither a metal layer nor a metal oxide layer was provided on the Al plating layer were also prepared.

A sliding test was performed on the Al-plated steel sheets (A1 to A51) obtained as described above using a die. This test is a test that simulated sliding between the die and the Al-plated steel sheet on a surface parallel to a direction in which the die moved during hot pressing. In the sliding test, a device shown in FIG. 2 was used, the Al-plated steel sheets were heated to heating temperatures shown in Table 3-1 to Table 3-4, then sandwiched in a die at a pressure of 3 kN, and slid a distance of 100 mm at forming temperatures Tm (° C.) and forming velocities V (mm/s) shown in Table 3-1 to Table 3-4, thereby forming the Al-plated steel sheets. Times taken from the completion of heating to the start of forming were set to 3 to 30 seconds. The atmosphere during heating was set to the atmospheric environment.

In addition, the die used for the sliding test was prepared as described below.

«Production of Die»

Figure 2:
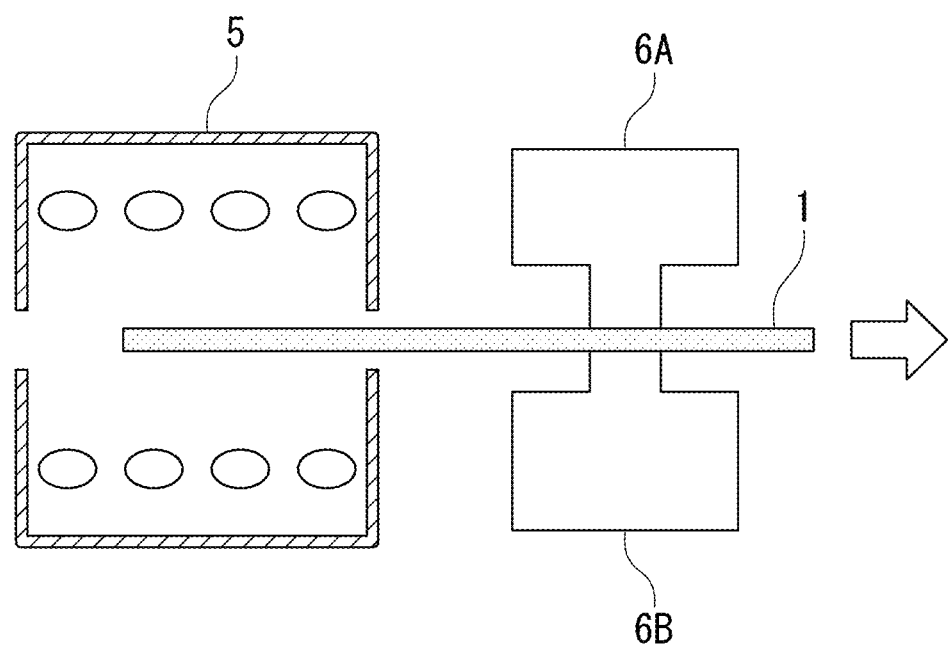
FIG. 2 is a view showing an evaluation device for a surface external appearance of a hot press-formed article.
Figure 3:
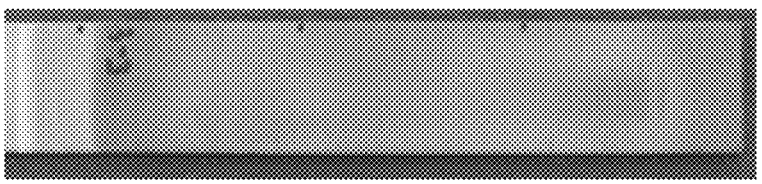
FIG. 3 is a view showing external appearances of sliding portions of hot formed articles tested with the evaluation device of FIG. 2 and measurement examples of glossiness.
Figure 3:
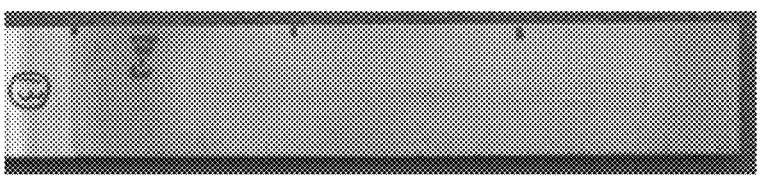
Figure 3:
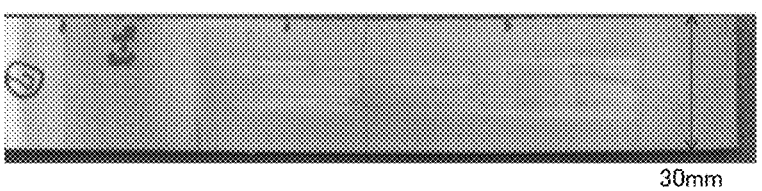

Steel corresponding to SKD61 (JIS G 4404: 2015) was prepared as tool steel, roughly processed into a shape approximate to a die shown by 6A and 6B in FIG. 2 in an annealed state, heated and held at 1180° C. in a vacuum, quenched by cooling with nitrogen gas, and then thermally refined by tempering at 540° C. to 580° C. such that the hardness became HV600. After that, finish processing was performed, thereby obtaining substrates for a plurality of dies.

On some of the substrates, an ion nitriding treatment was performed under conditions to be described below. Specifically, the ion nitriding treatment was performed in an atmosphere having a flow rate ratio of 5% $N_2$ (remainder: $H_2$) under a condition of holding the substrate at 500° C. for 5 hours. After that, each of the test surfaces was finished by polishing to form a nitriding layer. The hardness of the surface after the formation of the nitriding layer was HV1200.

In addition, on some of the substrates, a hard layer was formed at a site where the nitriding layer was formed. The hard layer was a PVD film, and plasma cleaning was performed with a thermal filament by applying a bias voltage in an Ar atmosphere using an arc ion plating device. After that, a PVD film was formed at a bias voltage using a variety of metal targets, which were the evaporation sources of metal components, $N_2$ gas as a base and $CH_4$ gas, if necessary, as reaction gases. The hardness of the surface of the die after the formation of the PVD film was prepared to HV2500, HV3200, or HV7000.

Table 3-1 to Table 3-4 show the individual forming conditions, the surface hardness of the dies used, and the surface temperatures at the start of forming.

Regarding the Al-plated steel sheets after the sliding test, the external appearances were evaluated. In some examples, in a case where a metal layer was provided on the surface, the metal layer was oxidized by heating on the hot press-formed article, and an oxide layer was formed.

[Evaluation of External Appearance after Forming]

A position of a sliding distance of 50 mm was cut out by cutting, and the glossiness (Gs60°) regulated in JIS Z 8741: 1997 was measured using a glossiness meter.

A glossiness of 25 or less was evaluated as VG (Very Good), a glossiness of more than 25 and 30 or less was evaluated as G (Good), and a glossiness of more than 30 was evaluated as NG (No Good).

[Evaluation of Wear Resistance]

In addition, the wear resistance of the dies was evaluated.

Specifically, for the shape profile of the surface of the die after forming, the arithmetic average roughness Ra was measured using a contact-type roughness meter (Kosaka Laboratory Ltd. SE700, measuring probe diameter R: 2 μm) according to JIS B 0601: 2013. The differences between Ra of a portion that did not slide and Ra of a portion that had slid were compared, a case where the Ra of the portion that had slid was 5 μm or more larger than Ra of a portion that did not slide was evaluated as NG (No Good), and a case where the difference was less than 5 μm was evaluated as G (Good).

The results are, shown in Table 3-1 to Table 3-4.

TABLE 3-1

| | Test No. | Coating layer | | Heating temperature [° C.] | Temperature rising rate [° C./s] | Forming temperature Tm [° C.] | Sliding test Test conditions | | | | | |
|---|---|---|---|---|---|---|---|---|---|---|---|---|
| | | | | | | | Determination 1 (Tm lower limit comparison) | | Determination 2 (Tm upper limit comparison) | | Determination 3 (Tm upper limit comparison) | |
| | | Material layer Metal oxide layer | Thickness [μm] | | | | 800 − HV_Die/ 40 | | 850 − (V/4) HV_Die/ 100 | | 850 − (V/2) HV_Die/ 50 | |
| Invention Example | A1 | ZnO | 1.0 | 930 | 6 | 750 | 738 | OK | 815 | OK | 780 | OK |
| Invention Example | A2 | ZnO | 1.0 | 950 | 6 | 750 | 738 | OK | 815 | OK | 780 | OK |
| Comparative Example | A3 | ZnO | 1.0 | 800 | 4 | 600 | 738 | NG | 815 | OK | 780 | OK |
| Comparative Example | A4 | ZnO | 1.0 | 1150 | 10 | 750 | 738 | OK | 815 | OK | 780 | OK |
| Invention Example | A5 | ZnO | 1.0 | 930 | 6 | 770 | 738 | OK | 815 | OK | 780 | OK |
| Invention Example | A6 | ZnO | 1.0 | 930 | 6 | 800 | 738 | OK | 815 | OK | 780 | NG |
| Comparative Example | A7 | ZnO | 1.0 | 930 | 6 | 600 | 738 | NG | 815 | OK | 780 | OK |
| Comparative Example | A8 | ZnO | 1.0 | 930 | 6 | 850 | 738 | OK | 815 | NG | 783 | NG |
| Invention Example | A9 | ZnO | 1.0 | 930 | 6 | 750 | 738 | OK | 805 | OK | 760 | OK |
| Invention Example | A10 | ZnO | 1.0 | 930 | 6 | 250 | 738 | GE | 803 | OK | 755 | OK |
| Invention Example | A11 | ZnO | 1.0 | 930 | 6 | 750 | 738 | OK | 798 | OK | 745 | NG |
| Invention Example | A12 | Zuo | 1.0 | 930 | 6 | 750 | 738 | OK | 775 | OK | 700 | NG |
| Comparative Example | A13 | Zuo | 1.0 | 930 | 6 | 800 | 738 | OK | 795 | NG | 740 | NG |
| Compasative Example | A14 | ZnO | 1.0 | 930 | 6 | 800 | 738 | OK | 775 | NG | 700 | NG |
| Comparative Exasuple | A15 | ZnO | 1.0 | 930 | 6 | 750 | 785 | NG | 834 | OK | 818 | OK |
| Comparative Example | A16 | Zao | 1.0 | 930 | 6 | 750 | 770 | NG | 828 | OK | 806 | OK |
| Comparative Example | A17 | ZnO | 1.0 | 930 | 6 | 800 | 785 | OK | 834 | OK | 818 | OK |
| Comparative Example | A18 | ZnO | 1.0 | 930 | 6 | 800 | 770 | OK | 828 | OK | 806 | OK |
| Invention Example | A19 | Zso | 1.0 | 930 | 6 | 750 | 720 | OK | 808 | OK | 766 | OK |
| Invention Example | A20 | ZnO | 1.0 | 930 | 6 | 800 | 720 | OK | 808 | OK | 766 | NG |
| Comparative Example | A21 | ZnO | 1.0 | 930 | 6 | 800 | 625 | OK | 770 | NG | 690 | NG |
| Invention Example | A22 | ZnO | 0.2 | 930 | 6 | 750 | 738 | GK | 815 | OK | 780 | OK |
| Invention Example | A23 | ZnO | 0.5 | 930 | 6 | 750 | 738 | OK | 815 | OK | 780 | OK |
| Invention Example | A24 | Zuo | 3.0 | 930 | 6 | 750 | 738 | OK | 815 | OK | 780 | OK |

TABLE 3-1-continued

| | | Coating layer | | Heating temperature [° C.] | Temperature rising rate [° C./s] | Forming temperature Tm [° C.] | Sliding test Test conditions | | | | | |
|---|---|---|---|---|---|---|---|---|---|---|---|---|
| | | | | | | | Determination 1 (Tm lower limit comparison) | | Determination 2 (Tm upper limit comparison) | | Determination 3 (Tm upper limit comparison) | |
| | Test No. | Material layer Metal oxide layer | Thickness [μm] | | | | 800 − HV_Die/ 40 | | 850 − (V/4) HV_Die/ 100 | | 850 − (V/2) HV_Die/ 50 | |
| Invention Example | A25 | Zuo | 6.0 | 930 | 6 | 750 | 738 | OK | 815 | OK | 780 | OK |
| Invention Exatsple | A26 | ZnO | 12.0 | 930 | 6 | 750 | 738 | OK | 815 | OK | 780 | OK |

TABLE 3-2

| | | Sliding test | | | Hot press-formed article after sliding test | | | | |
|---|---|---|---|---|---|---|---|---|---|
| | | Test condition Forming | Die | | External appearance of formed article (glossiness) | Coating layer on Al plating | | | |
| | Test No. | velocity V [mm/s] | Hardness Hv_Die | Surface temperature [° C.] | Gs [60°] | Kind | Thickness [μm] | Wear resistance of die | |
| Invention Example | A1 | 40 | 2500 | 20 | VG | ZnO | 1.0 | G | |
| Invention Example | A2 | 40 | 2500 | 20 | VG | ZnO | 1.0 | G | |
| Comparative Example | A3 | 40 | 2500 | 20 | NG | ZnO | 1.0 | G | |
| Comparative Example | A4 | 40 | 2500 | 20 | NG | ZnO | 1.0 | G | |
| Invention Example | A5 | 40 | 2500 | 20 | VG | ZnO | 1.0 | G | |
| Invention Example | A6 | 40 | 2500 | 20 | G | ZnO | 1.0 | G | |
| Comparative Example | A7 | 40 | 2500 | 20 | NG | ZnO | 1.0 | NG | |
| Comparative Example | A8 | 40 | 2500 | 20 | NG | ZnO | 1.0 | G | |
| Invention Example | A9 | 80 | 2500 | 20 | VG | ZnO | 1.0 | G | |
| Invention Example | A10 | 90 | 2500 | 20 | VG | ZnO | 1.0 | G | |
| Invention Example | A11 | 110 | 2500 | 20 | G | ZnO | 1.0 | G | |
| Invention Example | A12 | 200 | 2500 | 20 | G | ZnO | 1.0 | G | |
| Comparative Example | A13 | 120 | 2500 | 20 | NG | ZnO | 1.0 | G | |
| Comparative Example | A14 | 200 | 2500 | 20 | NG | ZnO | 1.0 | G | |
| Comparative Example | A15 | 40 | 600 | 20 | NG | ZnO | 1.0 | NG | |
| Comparative Example | A16 | 40 | 1200 | 20 | NG | ZnO | 1.0 | NG | |
| Comparative Example | A17 | 40 | 600 | 20 | NG | ZnO | 1.0 | NG | |
| Comparative- Example | A18 | 40 | 1200 | 20 | NG | ZnO | 1.0 | NG | |
| Invention Example | A19 | 40 | 3200 | 20 | VG | ZnO | 1.0 | G | |
| Invention Example | A20 | 40 | 3200 | 20 | G | ZnO | 1.0 | G | |
| Comparative Example | A21 | 40 | 7000 | 20 | NG | ZnO | 1.0 | G | |
| Invention Example | A22 | 40 | 2500 | 20 | G | ZnO | 0.2 | G | |

TABLE 3-2-continued

| | | Sliding test | | Hot press-formed article after sliding test | | | | |
|---|---|---|---|---|---|---|---|---|
| | | Test condition Forming | Die | | External appearance of formed article (glossiness) | Coating layer on Al plating | | Wear |
| | Test No. | velocity V [mm/s] | Hardness Hv_Die | Surface temperature [° C.] | Gs [60°] | Kind | Thickness [μm] | resistance of die |
| Invention Example | A23 | 40 | 2500 | 20 | VG | ZnO | 0.5 | G |
| Invention Example | A24 | 40 | 2500 | 20 | VG | ZnO | 3.0 | G |
| Invention Example | A25 | 40 | 2500 | 20 | VG | ZnO | 6.0 | G |
| Invention Example | A26 | 40 | 2500 | 20 | G | ZnO | 12.0 | G |

TABLE 3-3

| | | Coating layer | | | | | Sliding test Test conditions | | | | | |
|---|---|---|---|---|---|---|---|---|---|---|---|---|
| | Test No. | Material layer Metal oxide layer | Thickness [μm] | Heating temperature [° C.] | Temperature rising rate [° C./s] | Forming temperature Tm [° C.] | Determination 1 (Tm lower limit comparison) 800 − HV_Die/40 | | Determination 2 (Tm upper limit comparison) 800 − (V/4) HV_Die/100 | | Determination 3 (Tm upper limit comparison) 800 − (V/2) HV_Die/50 | |
| Invention Example | A27 | ZnO | 100 | 930 | 6 | 750 | 720 | OK | 808 | OK | 766 | OK |
| Invention Example | A28 | ZnO | 1.0 | 930 | 6 | 750 | 720 | OK | 808 | OK | 766 | OK |
| Invention Example | A29 | ZnO | 1.0 | 930 | 6 | 750 | 720 | OK | 808 | OK | 766 | OK |
| Invention Example | A30 | MgO | 0.5 | 930 | 6 | 750 | 720 | OK | 808 | OK | 766 | OK |
| Invention Example | A31 | CaO | 0.5 | 930 | 6 | 750 | 720 | OK | 808 | OK | 766 | OK |
| Invention Example | A32 | TiO$_2$ | 0.5 | 930 | 6 | 750 | 720 | OK | 808 | OK | 766 | OK |
| Invention Exarpl | A33 | V$_2$O$_5$ + TiO$_2$ | 0.5 | 930 | 6 | 750 | 720 | OK | 808 | OK | 766 | OK |
| Invention Example | A34 | MgO + ZnO | 0.5 | 930 | 6 | 750 | 720 | OK | 808 | OK | 766 | OK |
| Invention Example | A35 | ZnO + resin | 1.0 | 930 | 6 | 750 | 720 | OK | 808 | OK | 766 | OK |
| Invention Example | A36 | Za | 0.5 | 930 | 6 | 750 | 720 | OK | 808 | OK | 766 | OK |
| Invention Example | A37 | Mg | 0.5 | 930 | 6 | 750 | 720 | OK | 808 | OK | 766 | OK |
| Invention Example | A38 | Zn | 0.5 | 930 | 8 | 750 | 720 | OK | 808 | OK | 766 | OK |
| Invention Example | A39 | Mg | 0.5 | 930 | 10 | 750 | 720 | OK | 808 | OK | 766 | OK |
| Invention Example | A40 | Ca | 0.5 | 930 | 6 | 750 | 720 | OK | 808 | OK | 766 | OK |
| Invention Example | A41 | Ti | 0.5 | 930 | 6 | 750 | 720 | OK | 808 | OK | 766 | OK |
| Invention Example | A42 | V | 0.5 | 930 | 6 | 750 | 720 | OK | 808 | OK | 766 | OK |
| Invention Example | A43 | Zn + Mg | 0.5 | 930 | 6 | 750 | 720 | OK | 808 | OK | 766 | OK |
| Invention Example | A44 | Zu + V | 0.5 | 930 | 6 | 750 | 720 | OK | 808 | OK | 766 | OK |
| Invention Exampk | A45 | Zn + ZnO | 2.0 | 930 | 6 | 750 | 720 | OK | 808 | OK | 766 | OK |
| Invention Example | A46 | Mg + MgO | 2.0 | 930 | 6 | 750 | 720 | OK | 808 | OK | 766 | OK |

TABLE 3-3-continued

| | | Coating layer | | Sliding test Test conditions | | | Determination 1 (Tm lower limit comparison) | | Determination 2 (Tm upper limit comparison) | | Determination 3 (Tm upper limit comparison) | |
|---|---|---|---|---|---|---|---|---|---|---|---|---|
| | Test No. | Material layer Metal oxide layer | Thickness [μm] | Heating temperature [° C.] | Temperature rising rate [° C./s] | Forming temperature Tm [° C.] | 800 − HV_Die/ 40 | | 800 − (V/4) HV_Die/ 100 | | 800 − (V/2) HV_Die/ 50 | |
| Invention Example | A47 | Ca + CaO | 2.0 | 930 | 6 | 750 | 720 | OK | 808 | OK | 766 | OK |
| Invention Example. | A48 | Ti + TiO$_2$ | 2.0 | 930 | 6 | 750 | 720 | OK | 808 | OK | 766 | OK |
| Invention Example | A49 | V + V$_2$O$_5$ | 2.0 | 930 | 6 | 750 | 720 | OK | 808 | OK | 766 | OK |
| Comparative Example | A50 | None | None | 930 | 6 | 750 | 720 | OK | 808 | OK | 766 | OK |
| Comparative Example | A51 | None | None | 930 | 6 | 750 | 785 | NG | 834 | OK | 818 | OK |

TABLE 3-4

| | | Sliding test | | | Hot press-formed article after sliding test | | | |
|---|---|---|---|---|---|---|---|---|
| | | Test condition Forming velocity | Die | | External appearance of formed article (glossiness) | Coating layer on Al plating | | Wear resistance of die |
| | Test No. | V [mm/s] | Hardness Hv_Die | Surface temperature [° C.] | Gs [60°] | Kind | Thickness [μm] | |
| Invention Example | A27 | 40 | 3200 | 50 | VG | ZnO | 1.0 | G |
| Invention Example | A28 | 40 | 3200 | 100 | VG | ZnO | 1.0 | G |
| Invention Example | A29 | 40 | 3200 | 200 | G | ZnO | 1.0 | G |
| Invention Example | A30 | 40 | 3200 | 20 | VG | MgO | 0.5 | G |
| Invention Example | A31 | 40 | 3200 | 20 | VG | CaO | 0.5 | G |
| Invention Example | A32 | 40 | 3200 | 20 | VG | TiO$_2$ | 0.5 | G |
| Invention Example | A33 | 40 | 3200 | 20 | VG | V$_2$O$_5$ + TiO$_2$ | 0.5 | G |
| Invention Example | A34 | 40 | 3200 | 20 | VG | MgO + ZnO | 0.5 | G |
| Invention Example | A35 | 40 | 3200 | 20 | VG | ZnO | 0.5 | G |
| Invention Example | A36 | 40 | 3200 | 20 | VG | ZnO | 0.7 | G |
| Invention Example | A37 | 40 | 3200 | 20 | VG | MgO | 0.7 | G |
| Invention Example | A38 | 40 | 3200 | 20 | G | ZnO | 0.7 | G |
| Invention Example | A39 | 40 | 3200 | 20 | G | MgO | 0.7 | G |
| Invention Example | A40 | 40 | 3200 | 20 | VG | CaO | 0.7 | G |
| Invention Example | A41 | 40 | 3200 | 20 | VG | TiO2 | 0.7 | G |
| Invention Example | A42 | 40 | 3200 | 20 | VG | V$_2$O$_5$ | 0.7 | G |
| Invention Example | A43 | 40 | 3200 | 20 | VG | ZnO + MgO | 0.7 | G |
| Invention Example | A44 | 40 | 3200 | 20 | VG | ZnO + V$_2$O$_5$ | 0.7 | G |
| Invention Example | A45 | 40 | 3200 | 20 | VG | Zn + ZnO | 2.5 | G |

TABLE 3-4-continued

| | Test No. | Sliding test Test condition Forming velocity V [mm/s] | Die Hardness Hv_Die | Die Surface temperature [° C.] | Hot press-formed article after sliding test External appearance of formed article (glossiness) Gs [60°] | Coating layer on Al plating Kind | Coating layer on Al plating Thickness [μm] | Wear resistance of die |
|---|---|---|---|---|---|---|---|---|
| Invention Example | A46 | 40 | 3200 | 20 | VG | Mg + MgO | 2.5 | G |
| Invention Example | A47 | 40 | 3200 | 20 | VG | Ca + CaO | 2.5 | G |
| Invention Example | A48 | 40 | 3200 | 20 | VG | Ti + TiO$_2$ | 2.5 | G |
| Invention Example | A49 | 40 | 3200 | 20 | VG | V + V$_2$O$_5$ | 2.5 | G |
| Comparative Example | A50 | 40 | 3200 | 20 | NG | None | — | G |
| Comparative Example | A51 | 40 | 600 | 20 | NG | None | — | NG |

As is clear from Table 3-1 to Table 3-4, according to the present invention, it is possible to obtain a component in which the sliding portion of a hot press-formed article is beautiful (the glossiness Gs60° is 30 or less) while improving the wear resistance of a die.

In comparative examples, the heating temperature was too low in A3. In addition, the heating temperature was too high in A4. Therefore, a defect was generated in the Al-plated steel sheet after hot pressing, the glossiness increased to be more than 30, and the external appearance deteriorated.

In A7, the forming temperature was too low. In A8, A13, and A14, the forming temperatures were too high. Therefore, the external appearances of the Al-plated steel sheets after hot pressing deteriorated. In A7, the forming temperature was too low, and thus the die also worn.

In addition, in A15 to A18, the hardness of the surfaces of the dies was too low, and, in A15 and A16, the forming temperatures were too low. Therefore, the dies worn, and the external appearances of the Al-plated steel sheets after hot pressing also deteriorated.

In A21, the hardness of the surface of the die was too high. Therefore, a defect was generated in the Al-plated steel sheet after hot pressing, and the external appearance deteriorated.

In A50 and A51, since neither a metal layer nor a metal oxide layer was provided on the Al plating, a defect was generated on the surface of the Al-plated steel sheet after hot pressing, and the external appearance deteriorated. In A51, the hardness of the die was also low, and the wear of the die also occurred.

INDUSTRIAL APPLICABILITY

According to the present invention, a manufacturing method of a hot press-formed article for obtaining a hot press-formed article having an excellent surface external appearance while suppressing the wear of a die and a hot press-formed article having an excellent surface external appearance can be obtained.

BRIEF DESCRIPTION OF THE REFERENCE SYMBOLS

1 Al-plated steel sheet
2 Base steel sheet
3A Al plating layer (upper surface side)
3B Al plating layer (lower surface side)
4A coating layer (upper surface side)
4B coating layer (lower surface side)
5 Heating furnace for Al-plated steel sheet
6A Die (upper die that comes into contact with the upper surface of the Al-plated steel sheet)
6B Die (lower die that comes into contact with the lower surface of the Al-plated steel sheet)

The invention claimed is:

1. A manufacturing method of a hot press-formed article, comprising:
    heating an Al-plated steel sheet to 850° C. to 1000° C.; and
    forming the Al-plated steel sheet using a die to obtain a hot press-formed article, after the heating,
    wherein the Al-plated steel sheet has
        a base steel sheet,
        an Al plating layer formed on a surface of the base steel sheet, and
        a coating layer formed on a surface of the Al plating layer,
    the coating layer is a metal layer containing at least one metal of Mg, Ca, V, Ti, and Zn, a metal oxide layer containing an oxide of one or more of Mg, Ca, V, Ti, and Zn, or a mixed layer including the metal layer and the metal oxide layer,
    the die has a hard layer on a surface, $HV_{Die}$ that is a surface hardness of the die at a position that the hard layer is present, is HV1500 or more and HV3800 or less, and when a temperature of the Al-plated steel sheet at a start of forming is indicated by Tm in a unit of ° C., and an average movement velocity of the die from the start of forming to arrival of a bottom dead point is indicated by V in a unit of mm/s, in the forming, the Tm and the V satisfy the following formula (1), $$800-(HV_{Die}/40) \leq Tm \leq 850-(V/4)-(HV_{Die}/100) \quad \text{Formula (1)}.$$

2. The manufacturing method of a hot press-formed article according to claim 1,
wherein the $HV_{Die}$, the Tm, and the V satisfy the following formula (2), $$800-(HV_{Die}/40) \leq Tm \leq 850-(V/2)-(HV_{Die}/50) \quad \text{Formula (2)}.$$

3. The manufacturing method of a hot press-formed article according to claim 1,
wherein a thickness of the coating layer is 0.3 to 10.0 μm.

4. The manufacturing method of a hot press-formed article according to claim 1,
wherein a surface temperature of the die at the start of forming is 5° C. or higher and 180° C. or lower.

5. A hot press-formed article comprising an Al-plated steel sheet having an Al plating layer,
wherein Gs60° that is glossiness regulated by JIS Z 8741:1997 on a surface is 30 or less,
the hot press-formed article has a metallographic structure including martensite, and
a tensile strength of the hot press-formed article is 1000 MPa or more.

6. The hot press-formed article according to claim 5,
wherein the Gs60° is 25 or less.

7. The hot press-formed article according to claim 5, comprising:
a coating layer on a surface of the Al plating layer,
wherein the coating layer is a metal layer comprising at least one metal of Mg, Ca, V, Ti, and Zn, a metal oxide layer comprising an oxide of one or more of Mg, Ca, V, Ti, and Zn, or a mixed layer made up of the metal layer and the metal oxide layer.

8. The hot press-formed article according to claim 7,
wherein a thickness of the coating layer is 0.3 to 10.0 μm.

9. The manufacturing method of a hot press-formed article according to claim 2,
wherein a thickness of the coating layer is 0.3 to 10.0 μm.

10. The manufacturing method of a hot press-formed article according to claim 2,
wherein a surface temperature of the die at the start of forming is 5° C. or higher and 180° C. or lower.

11. The manufacturing method of a hot press-formed article according to claim 3,
wherein a surface temperature of the die at the start of forming is 5° C. or higher and 180° C. or lower.

12. The hot press-formed article according to claim 6, comprising:
a coating layer on a surface of the Al plating layer,
wherein the coating layer is a metal layer comprising at least one metal of Mg, Ca, V, Ti, and Zn, a metal oxide layer comprising an oxide of one or more of Mg, Ca, V, Ti, and Zn, or a mixed layer made up of the metal layer and the metal oxide layer.

* * * * *